United States Patent
Ohmori

(12) United States Patent     (10) Patent No.: US 7,142,328 B2
Ohmori     (45) Date of Patent: Nov. 28, 2006

(54) IMAGE REDUCTION METHOD, IMAGE PROCESSING DEVICE AND METHOD OF CONTROLLING IMAGE PROCESSING DEVICE

(75) Inventor: Masatake Ohmori, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1025 days.

(21) Appl. No.: 10/010,875

(22) Filed: Nov. 12, 2001

(65) Prior Publication Data

US 2002/0041718 A1    Apr. 11, 2002

Related U.S. Application Data

(63) Continuation-in-part of application No. 09/919,570, filed on Jul. 31, 2001.

(30) Foreign Application Priority Data

Aug. 1, 2000    (JP)    ............................. 2000-232943

(51) Int. Cl.
*H04N 1/40*    (2006.01)
(52) U.S. Cl. ........................................ 358/1.2; 358/296
(58) Field of Classification Search ................. 358/1.2, 358/1.9, 1.15–1.18, 2.1, 296
See application file for complete search history.

(56) References Cited

FOREIGN PATENT DOCUMENTS

JP        62112475 A   *   5/1987

* cited by examiner

*Primary Examiner*—Thomas D. Lee
*Assistant Examiner*—Stephen Brinich
(74) *Attorney, Agent, or Firm*—Cooper & Dunham LLP

(57) ABSTRACT

A method of reducing a size of a binary image, includes the steps of reducing the size of the binary image in a sub-scanning direction by using a conditional OR process and limiting a size-change point determined by a reduction rate to an odd-number line or an even-number line.

54 Claims, 20 Drawing Sheets

| B(n-3) | B(n-2) | B(n-1) | B(n) |
|---|---|---|---|
| R(n-1) | | R(n) | |

FIG.1A ORIGINAL DATA

FIG.1B REDUCED IMAGE DATA

FIG.2A ORIGINAL DATA

| Bo(n-2) | Be(n-1) | Bo(n-1) | Be(n) | Bo(n) |
|---------|---------|---------|-------|-------|

FIG.2B RESULT OF EVEN NUMBER

| Re(n-1) | Re(n) |
|---------|-------|

FIG.2C RESULT OF ODD NUMBER

| Ro(n-1) | Ro(n) |
|---------|-------|

FIG.9

(REDUCTION RATE : 50%)

| LINE NUMBER | LINE ATTRIBUTE | SIZE-CHANGE POINT | CONDITIONAL OR FLAG | THIN-OUT FLAG | OUTPUT DATA | OUTPUT LINE NUMBER |
|---|---|---|---|---|---|---|
| 1 | ODD | ○ | ○ | | NONE | |
| 2 | EVEN | | | | RESULT OF CONDITIONAL OR PROCESS | 1 |
| 3 | ODD | ○ | ○ | | NONE | |
| 4 | EVEN | | | | RESULT OF CONDITIONAL OR PROCESS | 2 |
| 5 | ODD | ○ | ○ | | NONE | |
| 6 | EVEN | | | | RESULT OF CONDITIONAL OR PROCESS | 3 |

FIG.10A (REDUCTION RATE : 60%)

| LINE NUM-BER | LINE ATTRI-BUTE | SIZE-CHANGE POINT | CONDI-TIONAL OR FLAG | THIN-OUT FLAG | OUTPUT DATA | OUTPUT LINE NUMBER |
|---|---|---|---|---|---|---|
| 1 | ODD | O | O | | NONE | |
| 2 | EVEN | | | | RESULT OF CONDITIONAL OR PROCESS | 1 |
| 3 | ODD | O | O | | NONE | |
| 4 | EVEN | | | | RESULT OF CONDITIONAL OR PROCESS | 2 |
| 5 | ODD | | | | NORMAL OUTPUT | 3 |
| 6 | EVEN | O | | O | NORMAL OUTPUT | 4 |
| 7 | ODD | | O | | NONE | |
| 8 | EVEN | O | | O | NORMAL OUTPUT | 5 |
| 9 | ODD | | O | | NONE | |
| 10 | EVEN | | | | RESULT OF CONDITIONAL OR PROCESS | 6 (6/10) |
| 11 | ODD | O | O | | NONE | |
| 12 | EVEN | | | | RESULT OF CONDITIONAL OR PROCESS | 7 |
| 13 | ODD | O | O | | NONE | |
| 14 | EVEN | | | | RESULT OF CONDITIONAL OR PROCESS | 8 |
| 15 | ODD | | | | NORMAL OUTPUT | 9 |

FIG.10B (REDUCTION RATE : 60%)

| LINE NUM-BER | LINE ATTRI-BUTE | SIZE-CHANGE POINT | CONDI-TIONAL OR FLAG | THIN-OUT FLAG | OUTPUT DATA | OUTPUT LINE NUMBER |
|---|---|---|---|---|---|---|
| 1 | ODD | ○ | ○ | | NONE | |
| 2 | EVEN | | | | RESULT OF CONDITIONAL OR PROCESS | 1 |
| 3 | ODD | ○ | ○ | | NONE | |
| 4 | EVEN | | | | RESULT OF CONDITIONAL OR PROCESS | 2 |
| 5 | ODD | | | | NORMAL OUTPUT | 3 |
| 6 | EVEN | ○ | | ○ | NORMAL OUTPUT | 4 |
| 7 | ODD | | ○ | | NONE | |
| 8 | EVEN | ○ | | ○ | RESULT OF CONDITIONAL OR PROCESS | 5 |
| 9 | ODD | | ○ | | NONE | |
| 10 | EVEN | | | | RESULT OF CONDITIONAL OR PROCESS | 6 (6/10) |
| 11 | ODD | ○ | ○ | | NONE | |
| 12 | EVEN | | | | RESULT OF CONDITIONAL OR PROCESS | 7 |
| 13 | ODD | ○ | ○ | | NONE | |
| 14 | EVEN | | | | RESULT OF CONDITIONAL OR PROCESS | 8 |
| 15 | ODD | | | | NORMAL OUTPUT | 9 |

FIG.12

(REDUCTION RATE : 30%)

| LINE NUM-BER | LINE ATTRI-BUTE | SIZE-CHANGE POINT | LINE NUMBER AFTER THINNING-OUT | OUTPUT DATA | OUTPUT LINE NUMBER |
|---|---|---|---|---|---|
| 1 | ODD | O | | NONE | |
| 2 | EVEN | | 1 | NONE | |
| 3 | ODD | O | | NONE | |
| 4 | EVEN | | 2 | RESULT OF CONDITIONAL OR PROCESS | 1 |
| 5 | ODD | | 3 | NONE | |
| 6 | EVEN | O | | NONE | |
| 7 | ODD | | 4 | RESULT OF CONDITIONAL OR PROCESS | 2 |
| 8 | EVEN | O | | NONE | |
| 9 | ODD | | 5 | NONE | |
| 10 | EVEN | | 6 | RESULT OF CONDITIONAL OR PROCESS | 3 (3/10) |
| 11 | ODD | O | | NONE | |
| 12 | EVEN | | 7 | NONE | |
| 13 | ODD | O | | NONE | |
| 14 | EVEN | | 8 | RESULT OF CONDITIONAL OR PROCESS | 4 |
| 15 | ODD | | 9 | NORMAL OUTPUT | |

IMAGE REDUCTION METHOD, IMAGE PROCESSING DEVICE AND METHOD OF CONTROLLING IMAGE PROCESSING DEVICE

This is a continuation-in-part of application Ser. No. 09/919,570 filed Jul. 31, 2001.

BACKGROUND OF THE INVENTION

1. Field of the Invention

The present invention relates to an image reduction method for processing a binary image, an image processing device and a method of controlling the image processing device.

2. Description of the Related Art

In general, a simple thinning-out method is used as a related-art method of reducing a binary image. According to the simple thinning-out method, a pixel is eliminated from an image at each fixed interval in accordance with a reduction rate, and a reduced image is expressed with remaining pixels. For example, in a case in which image data is reduced by 50%, or its reduction rate is 50%, a reduced image is obtained by eliminating every other pixel.

However, according to this simple thinning-out method, a thin line or the like expressed by one dot is eliminated entirely from a reduced image in a case in which the thin line or the like corresponds to pixels to be eliminated. The above situation is called line breaking or dot missing. Thus, a weak point of the simple thinning-out method is that a degree of decrease in quality of the reduced image is large.

For instance, an image reduction method carrying out an OR process is used as a method of reducing the decrease in quality of the reduced image. The image reduction method carrying out the OR process is a method that uses a result of carrying out a logical OR process to two dots when composing a single dot from the two dots during an image reduction process. This image reduction method carrying out the OR process, unlike the above-described simple thinning-out method, prevents elimination of a line in a reduced image. At the same time, the image reduction method carrying out the OR process occasionally causes a failure in which a part to be remained as white becomes black in the reduced image. In other words, line thickening or blackening occasionally occurs in the reduced image.

A method dealing with a problem about the decrease in quality of the reduced image caused by the above-described image reduction methods is a conditional OR process, for example. According to the conditional OR process, values of pixel data after an image reduction process are determined by the following equation (I).

$$R(n) = ((NOT(R(n-1))) AND (B(n))) OR (B(n-1)) \quad (I)$$

R(n), R(n−1), B(n) and B(n−1) in the above equation (I) indicate pixel data after an image reduction process, previously-reduced image data, currently focused pixel data, and pixel data that is one pixel before the currently focused pixel data, respectively. A positioning relation between the pixel data of original image data and the pixel data of image data after being processed through the image reduction process is shown in FIGS. 1A and 1B.

By adopting the conditional OR process to the image reduction process, white pixels can remain in a reduced image, even in a case in which the white pixels are arranged so that the white pixels become black by the simple thinning-out method. Thus, the adoption of the conditional OR process to the image reduction process can suppress decrease in quality of a reduced image.

The above-described conditional OR process is basically a process to reduce two pixels to one as shown in FIGS. 1A and 1B, and, thus, needs to store a resulted pixel that is necessary for the next calculation, separately for each focused pixel whose order is an odd or even number, as shown in FIGS. 2A, 2B and 2C.

In other words, a result of carrying out the conditional OR process to focused pixels whose orders are odd numbers and a result of carrying out the conditional OR process to focused pixels whose orders are even numbers are different information series. Thus, a result of carrying out the conditional OR process must be stored for processing each of the focused pixels whose orders are odd numbers and the focused pixels whose orders are even numbers.

In a case in which this conditional OR process is applied to an image reduction process in a sub-scanning direction, white pixels can remain in a reduced image similarly to an image reduction process in a main-scanning direction, even if white pixels are arranged so that the white pixels become black by the simple thinning-out method. Thus, the adoption of the conditional OR process to the image reduction process can suppress decrease in quality of a reduced image.

However, in the case in which the conditional OR process is applied to the image reduction in the sub-scanning direction, memory means is necessary for storing results of carrying out the conditional OR process to each of a line whose order is an odd number and a line whose order is an even number, thereby increasing a device cost.

SUMMARY OF THE INVENTION

Accordingly, it is a general object of the present invention to provide an image reduction method, an image processing device and a method of controlling the image processing device. A more particular object of the present invention is to provide an image reduction method, an image processing device and a method of controlling the image processing device, by which a device cost decreases in a case in which a conditional OR process is applied to an image reduction process in a sub-scanning direction.

The above-described objects of the present invention are achieved by a method of reducing a size of a binary image, comprising the steps of:

reducing the size of the binary image in a sub-scanning direction by using a conditional OR process; and limiting a size-change point determined by a reduction rate to an odd-number line or an even-number line.

Additionally, the above-described objects of the present invention are also achieved by the method of reducing the size of a binary image as described above, further comprising the step of thinning out an image of either a line immediately preceding or a line immediately following the size-change point.

Additionally, the above-described objects of the present invention are also achieved by a method of reducing a size of a binary image, wherein a reduction process in a sub-scanning direction comprises the steps of:

thinning out an image of an odd-numbered line and producing a reduced image using a conditional OR process for an even-number line immediately following the odd-number line when a size-change point determined by a reduction rate is the odd-number line, producing a reduced image using a conditional OR process for an even-number line and thinning out an image of an odd-number line immediately following the even-number line when the size-change point determined by the reduction rate is the even-number line.

Additionally, the above-described objects of the present invention are also achieved by a method of reducing a size of a binary image, wherein a reduction process in a sub-scanning direction comprises the steps of:

thinning out an image of an even-numbered line and producing a reduced image using a conditional OR process for an odd-number line immediately following the even-number line when a size-change point determined by a reduction rate is the even-number line, producing a reduced image using a conditional OR process for an odd-number line and thinning out an image of an even-number line immediately following the odd-number line when the size-change point determined by the reduction rate is the odd-number line.

According to the above-described invention, a device cost can be decreased to below that of a device that uses the conditional OR process to reduce the size of a binary image in the sub-scanning direction.

Additionally, the above-described objects of the present invention are also achieved by the method of reducing the size of a binary image as described above, wherein the size of the binary image in a scanning direction is reduced before the size of the binary image in the sub-scanning direction is reduced.

According to the above-described invention, the device cost can be reduced.

Additionally, the above-described objects of the present invention are also achieved by the method of reducing the size of a binary image as described above, wherein, when a target reduction rate is 50 percent or below (for example, 30%), a binary image of the target reduction rate is produced by reducing the size of the binary image in the sub-scanning direction to twice (60% in the above-mentioned example) the target reduction rate using a simple thinning-out method and further reducing the reduced binary image to the target reduction rate (30% in the above-mentioned example) using the conditional OR process.

According to the above-described invention, high rates of reduction can be achieved using the conditional OR process.

Additionally, the above-described objects of the present invention are also achieved by an image processing device-for processing a binary image comprising:

an image size reduction component that reduces the size of the binary image in a sub-scanning direction by using a conditional OR process; and a limiting component that limits a size-change point determined by a reduction rate to an odd-number line or an even-number line.

Additionally, the above-described objects of the present invention are also achieved by the image processing device for processing a binary image as described above, further comprising a component that thins out an image of either a line immediately preceding or a line immediately following the size-change point.

Additionally, the above-described objects of the present invention are also achieved by an image processing device for processing a binary image comprising:

a first component that thins out an image of an odd-numbered line and produces a reduced image using a conditional OR process for an even-number line immediately following the odd-number line when a size-change point determined by a reduction rate is the odd-number line; and a second component that produces a reduced image using a conditional OR process for an even-number line and thins out an image of an odd-number line immediately following the even-number line when the size-change point determined by the reduction rate is the even-number line.

Additionally, the above-described objects of the present invention are also achieved by an image processing device for processing a binary image comprising:

a first component that thins out an image of an even-numbered line and produces a reduced image using a conditional OR process for an odd-number line immediately following the even-number line when a size-change point determined by a reduction rate is the even-number line; and a second component that produces a reduced image using a conditional OR process for an odd-number line and thins out an image of an even-number line immediately following the odd-number line when the size-change point determined by the reduction rate is the odd-number line.

According to the above-described invention, a device cost can be decreased to below that of a device that uses the conditional OR process to reduce the size of a binary image in the sub-scanning direction.

Additionally, the above-described objects of the present invention are also achieved by the image processing device as described above, wherein the image size reduction component reduces the size of the binary image in a scanning direction before reducing the size of the binary image in the sub-scanning direction.

According to the above-described invention, high rates of reduction can be achieved using the conditional OR process.

Additionally, the above-described objects of the present invention are also achieved by the image processing device as described above, wherein the image size reduction component, when a target reduction rate is 50 percent or below, produces a binary image of the target reduction by reducing the size of the binary image in the sub-scanning direction using a simple thinning-out method to twice the target reduction rate and further reduces the reduced binary image to the target reduction rate using the conditional OR process.

According to the above-described invention, high rates of reduction can be achieved using the conditional OR process.

Additionally, the above-described objects of the present invention are also achieved by the image processing device as described above, wherein the image size reduction component, when a current process line is other than the size-change point, reads and then discards data of an immediately preceding line memory component, and rewrites data read from a memory component in which a preceding reduction result is stored to the preceding line memory component.

According to the above-described invention, the data input-output relationship can be made the same under all conditions, thus simplifying memory access control.

Additionally, the above-described objects of the present invention are also achieved by an image processing device for processing a binary image comprising:

a conditional OR processing component that reduces a size of an image in a sub-scanning direction using a conditional OR process;

a reduction result line memory component that stores data output from the conditional OR processing component;

an immediately preceding line memory component that stores binary image data of an immediately preceding line; and a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, and limits a size-change point determined by a reduction rate and employing the data output from the conditional OR processing component to either an odd-number line or an even-number line.

Additionally, the above-described objects of the present invention are also achieved by the image processing device as described above, wherein the control component further thins out an image of either a line immediately preceding or a line immediately following the odd-number line or the even-number line corresponding to the size-change point.

Additionally, the above-described objects of the present invention are also achieved by an image processing device for processing a binary image comprising:

a conditional OR processing component that reduces a size of an image in a sub-scanning direction using a conditional OR process;

a reduction result line memory component that stores data output from the conditional OR processing component;

an immediately preceding line memory component that stores binary image data of an immediately preceding line; and a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, wherein:

when a size-change point determined by a reduction rate is an odd-number line, the control component thins out an image of the odd-number line and outputs reduction data output from the conditional OR processing component for an even-number line immediately succeeding the odd-number line; and when the size-change point determined by the reduction rate is an even-number line, the control component outputs reduction data output from the conditional OR processing component for the even-number line and thins out an image of an odd-number line immediately succeeding the even-number line.

Additionally, the above-described objects of the present invention are also achieved by an image processing device for processing a binary image comprising:

a conditional OR processing component that reduces a size of an image in a sub-scanning direction using a conditional OR process;

a reduction result line memory component that stores data output from the conditional OR processing component;

an immediately preceding line memory component that stores binary image data of an immediately preceding line; and a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, wherein:

when a size-change point determined by a reduction rate is an even-number line, the control component thins out an image of the even-number line and outputs reduction data output from the conditional OR processing component for an odd-number line immediately succeeding the even-number line; and when the size-change point determined by the reduction rate is an odd-number line, the control component outputs reduction data output from the conditional OR processing component for the odd-number line and thins out an image of an even-number line immediately succeeding the odd-number line.

According to the above-described invention, a device cost can be decreased to below that of a device that uses the conditional OR process to reduce the size of a binary image in the sub-scanning direction.

Additionally, the above-described objects of the present invention are also achieved by the image processing device as described above, wherein the control component reduces the size of the binary image in a scanning direction before reducing the size of the binary image in the sub-scanning direction.

According to the above-described invention, the device cost can be reduced.

Additionally, the above-described objects of the present invention are also achieved by the image processing device as described above, wherein the control component, when a target reduction rate is 50 percent or below, produces a binary image of the target reduction rate by reducing the size of the binary image in the sub-scanning direction to twice the target reduction rate using a simple thinning-out method and further reducing the reduced binary image to the target reduction rate using the conditional OR process.

According to the above-described invention, high rates of reduction can be achieved using the conditional OR process.

Additionally, the above-described objects of the present invention are also achieved by a method of controlling an image processing device for processing a binary image, the method comprising the steps of:

reducing a size of an image in a sub-scanning direction using a conditional OR process conducted by a conditional OR processing component;

storing data output from the conditional OR processing component in a reduction result line memory component;

storing binary image data of an immediately preceding line in an immediately preceding line memory component;

inputting binary image data of a current processing line, preceding reduction result data read from the reduction result line memory component, and binary image data of an immediately preceding line read from the immediately preceding line memory component to the conditional OR processing component so as to perform conditional OR processing of the current processing line; and limiting a size-change point determined by a reduction rate and employing the data output from the conditional OR processing component to either an odd-number line or an even-number line.

Additionally, the above-described objects of the present invention are also achieved by the method of controlling an image processing device for processing a binary image as described above, further comprising the step of:

thinning out an image of either a line immediately preceding or a line immediately following the odd-number line or the even-number line corresponding to the size-change point.

Additionally, the above-described objects of the present invention are also achieved by a method of controlling an image processing device for processing a binary image, the method comprising the steps of:

reducing a size of an image in a sub-scanning direction using a conditional OR process conducted by a conditional OR processing component;

storing data output from the conditional OR processing component in a reduction result line memory component;

storing binary image data of an immediately preceding line in an immediately preceding line memory component;

inputting binary image data of a current processing line, preceding reduction result data read from the reduction result line memory component, and binary image data of an immediately preceding line read from the immediately preceding line memory component to the conditional OR processing component so as to perform conditional OR processing of the current processing line;

thinning out an image of an odd-number line and outputting reduction data output from the conditional OR processing component for an even-number line immediately succeeding the odd-number line when a size-change point determined by a reduction rate is the odd-number line; and outputting reduction data output from the conditional OR processing component for an even-number line and thinning out an image of an odd-number line immediately succeeding the even-number line when the size-change point determined by the reduction rate is the even-number line.

Additionally, the above-described objects of the present invention are also achieved by a method of controlling an image processing device for processing a binary image, the method comprising the steps of:

reducing a size of an image in a sub-scanning direction using a conditional OR process conducted by a conditional OR processing component;

storing data output from the conditional OR processing component in a reduction result line memory component;

storing binary image data of an immediately preceding line in an immediately preceding line memory component;

inputting binary image data of a current processing line, preceding reduction result data read from the reduction result line memory component, and binary image data of an immediately preceding line read from the immediately preceding line memory component to the conditional OR processing component so as to perform conditional OR processing of the current processing line;

thinning out an image of an even-number line and outputting reduction data output from the conditional OR processing component for an odd-number line immediately succeeding the even-number line when a size-change point determined by a reduction rate is the even-number line; and outputting reduction data output from the conditional OR processing component for an odd-number line and thinning out an image of an even-number line immediately succeeding the odd-number line when the size-change point determined by the reduction rate is the odd-number line.

According to the above-described invention, a device cost can be decreased to below that of a device that uses the conditional OR process to reduce the size of a binary image in the sub-scanning direction.

Additionally, the above-described objects of the present invention are also achieved by the method of controlling an image processing device for processing a binary image as described above, wherein the size of the binary image in a scanning direction is reduced before the size of the binary image in the sub-scanning direction is reduced.

According to the above-described invention, the device cost can be reduced.

Additionally, the above-described objects of the present invention are also achieved by the method of controlling an image processing device for processing a binary image as described above, wherein, when a target reduction rate is 50 percent or below, a binary image of the target reduction rate is produced by reducing the size of the binary image in the sub-scanning direction to twice the target reduction rate using a simple thinning-out method and further reducing the reduced binary image to the target reduction rate using the conditional OR process.

According to the above-described invention, high rates of reduction can be achieved using the conditional OR process.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams used for describing a conditional OR process;

FIGS. 2A, 2B and 2C are diagrams showing code series created differently for pixels whose orders are odd or even numbers;

FIG. 9 is a diagram showing the sub-scanning-direction reduction process in a case in which a reduction rate is 50%;

FIGS. 10A and 10B are diagrams showing the sub-scanning-direction reduction process in a case in which the reduction rate is 60%;

FIG. 12 is a diagram showing the sub-scanning-direction reduction process in a case in which the reduction rate is 30%;

DESCRIPTION OF THE PREFERRED EMBODIMENTS

A description will now be given of preferred embodiments of the present invention, with reference to the accompanying drawings.

Figure 3:
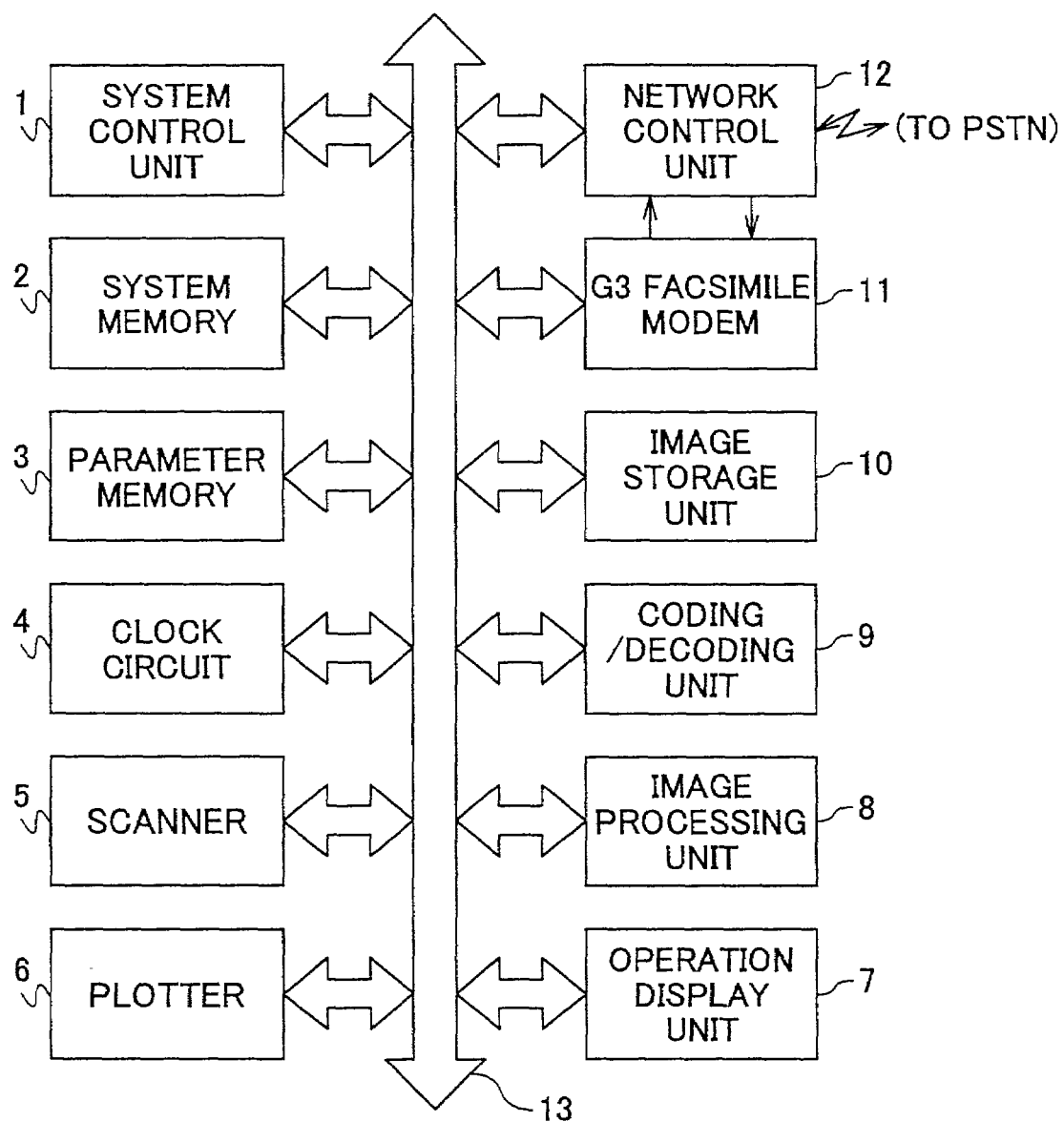
FIG. 3 is a block diagram showing a Group-3 (G3) facsimile device according to an embodiment of the present invention.

FIG. 3 is a block diagram showing a Group-3 (G3) facsimile device according to an embodiment of the present invention. The G3 facsimile device shown in FIG. 3 includes a system control unit 1, a system memory 2, a parameter memory 3, a clock circuit 4, a scanner 5, a plotter 6, an operation display unit 7, an image processing unit 8, a coding/decoding unit 9, an image storage unit 10, a G3 facsimile modem 11, a network control unit 12 and an internal bus 13.

The system control unit 1 carries out a control process for each unit included in the G3 facsimile device and a fixed G3 facsimile transmission control procedure. The system memory 2 stores a control process program executed by the system control unit 1, and various data necessary for executing the control process program. Additionally, the system memory 2 composes a work area for the system control unit 1. The parameter memory 3 stores various types of information peculiar to the G3 facsimile device. The clock circuit 4 outputs current time information.

The scanner 5 reads a document image at a fixed resolution. The plotter 6 outputs or records an image at a fixed resolution. The operation display unit 7 is used for operating the G3 facsimile device, and is composed of various operation keys and displays. The image processing unit 8 carries out various image processes such as a process to change a size of image data. The coding/decoding unit 9 codes an image signal, and decodes coded image information to an original image signal. The image storage unit 10 stores the coded image information.

The G3 facsimile modem 11 achieves a modem function of a G3 facsimile device, and includes a low-speed modem function such as a V.21 modem for exchanging a transmission procedure signal, and a high-speed modem function such as a V.17 modem, a V.34 modem, a V.29 modem, or a V.27ter modem mainly for exchanging image information. The network control unit 12 connects the G3 facsimile device to an analog public network PSTN, and includes an automatic transmission/reception function.

The above-described units 1 through 12 are connected to the internal bus 13. Data is exchanged among the units 1 through 12, mainly through this internal bus 13. Additionally, data is directly exchanged between the G3 facsimile modem 11 and the network control unit 12.

Figure 4:
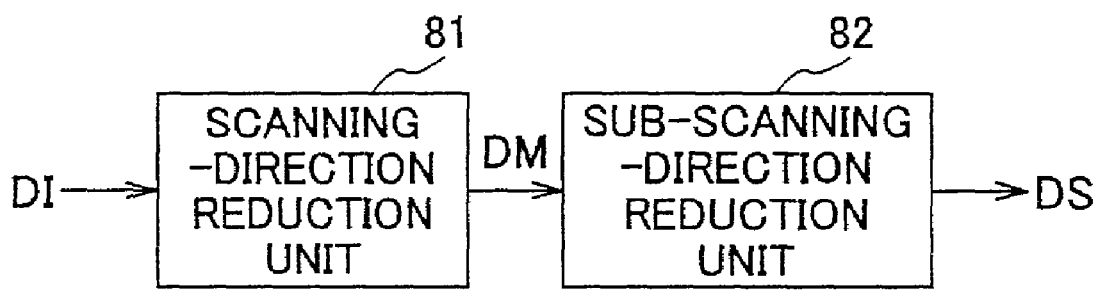
FIG. 4 is a block diagram showing a construction of an image processing unit for reducing a size of a binary image.

FIG. 4 is a block diagram showing a construction of the image processing unit 8 for reducing a size of a binary image. The image processing unit 8 includes a main-scanning-direction reduction processing unit (a main reduction unit) 81 and a sub-scanning-direction reduction processing unit (a sub reduction unit) 82. The main-scanning-direction reduction processing unit 81 reduces a size of original binary image data DI in a main-scanning direction at a specified reduction rate, by applying a fixed method such as the above-described conditional OR process. An output of the main-scanning-direction reduction processing unit 81 is supplied as main-scanning-direction reduced data DM to the sub-scanning-direction reduction processing unit 82.

The sub-scanning-direction reduction processing unit 82 reduces a size of the main-scanning-direction reduced data DM in a sub-scanning direction at a specified reduction rate, by applying the above-described conditional OR process. An output of the sub-scanning-direction reduction processing unit 82 is supplied as reduced data DS to the next-level device. In this case, the next-level device is the coding/decoding unit 9 when transmitting image information, or the plotter 6 when recording the image information.

Figure 5:
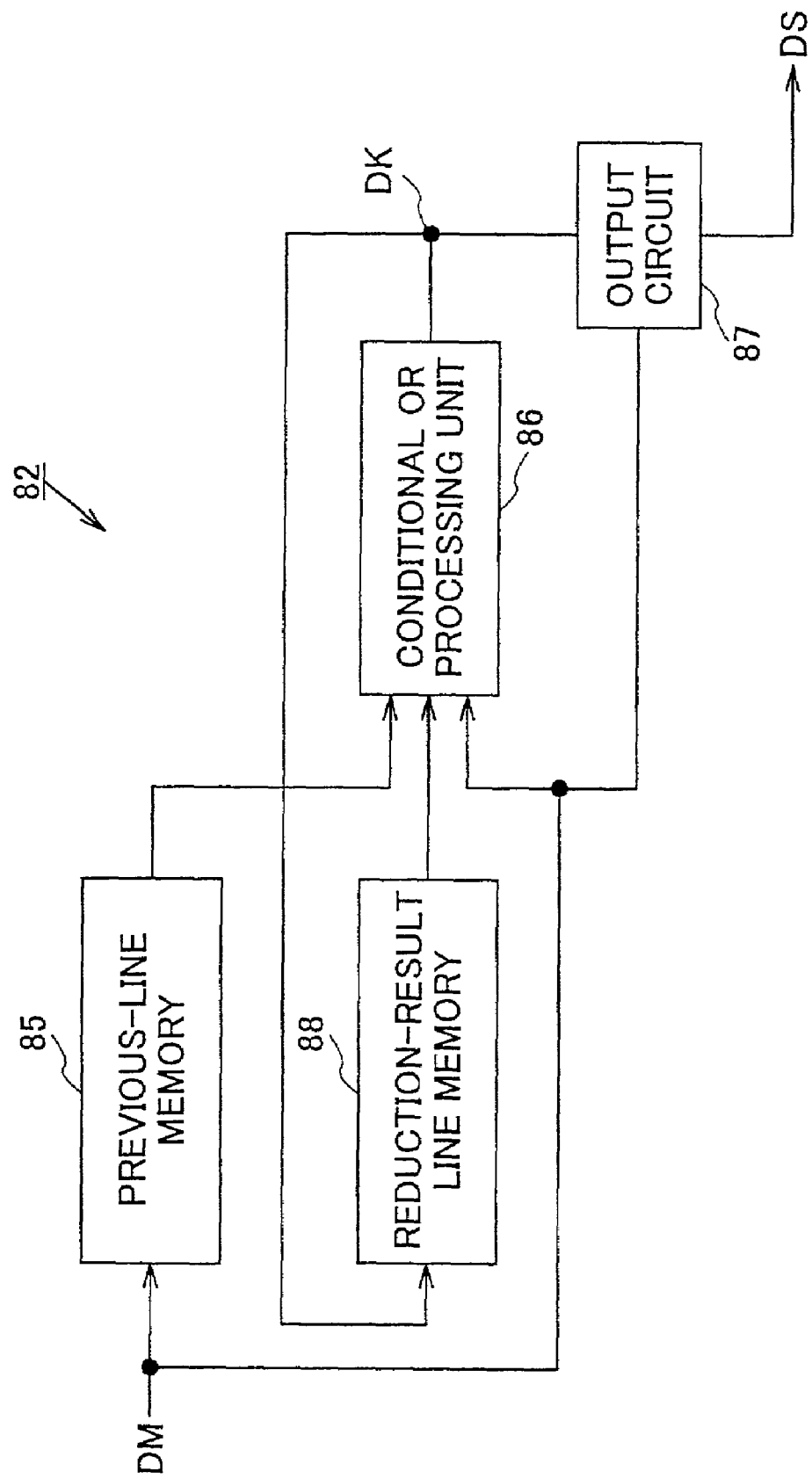
FIG. 5 is a block diagram showing a construction of a sub-scanning-direction reduction processing unit.

FIG. 5 is a block diagram showing a construction of the sub-scanning-direction reduction processing unit 82. The sub-scanning-direction reduction processing unit 82 shown in FIG. 5 includes a previous-line memory 85, a conditional OR processing unit 86, an output circuit 87 and a reduction-result line memory 88.

The main-scanning-direction reduced data DM is supplied to the previous-line memory 85 that stores binary image data of the previous line in the conditional OR process, the conditional OR processing unit 86 that carries out the conditional OR process, and the output circuit 87. Additionally, the reduction-result line memory 88 stores output data DK outputted from the conditional OR processing unit 86 as a processing result of the previous conditional OR process.

The output circuit 87 outputs the main-scanning-direction reduced data DM or the output data DK of the conditional OR processing unit 86 as the reduced data DS to the next-level device. Additionally, the conditional OR processing unit 86 carries out the conditional OR process to each pixel position of lines whose orders are even numbers based on the main-scanning-direction reduced data DM, previous line data outputted from the previous-line memory 85, and the previous reduced data DS outputted from the reduction-result line memory 88. Subsequently, the conditional OR processing unit 88 outputs the output data DK obtained by carrying out the conditional OR process.

Figure 6:
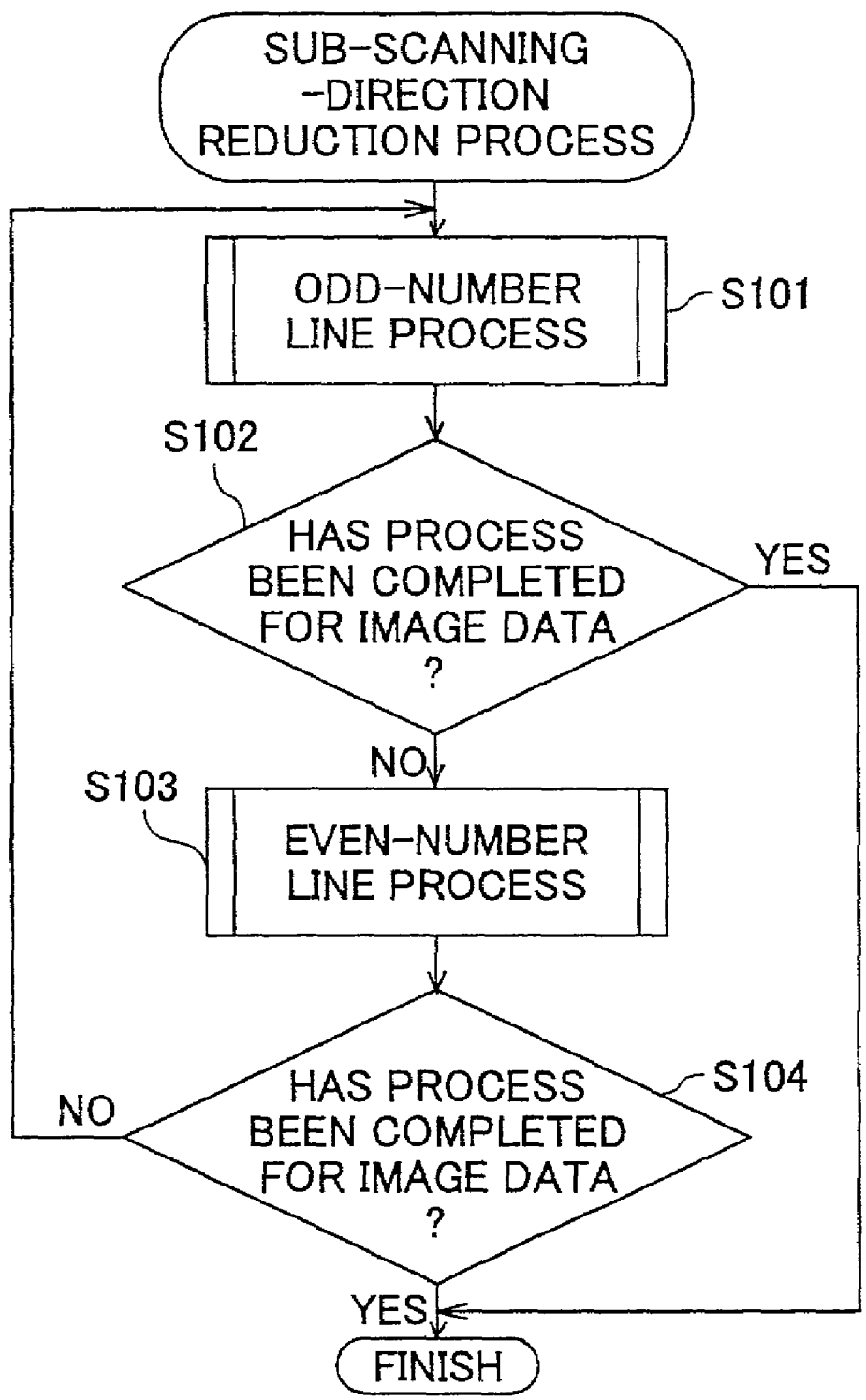
FIG. 6 is a flowchart showing a sub-scanning-direction reduction process carried out by the sub-scanning-direction reduction processing unit.

FIG. 6 is a flowchart showing a sub-scanning-direction reduction process carried out by the sub-scanning-direction reduction processing unit 82. The sub-scanning-direction reduction processing unit 82 carries out an odd-number line process for processing a line whose order is an odd number, at a step S101. Subsequently, the sub-scanning-direction reduction processing unit 82 decides whether the sub-scanning-direction reduction processing unit 82 has completed carrying out the sub-scanning-direction reduction process to a page of image data, at a step S102.

If it is determined at the step S102 that the sub-scanning-direction reduction processing unit 82 has not completed carrying out the sub-scanning-direction reduction process to the page of image data, the sub-scanning-direction reduction processing unit 82 carries out an even-number line process for processing a line whose order is an even number, to the next line, at a step S103.

At a step S104 following the step S103, the sub-scanning-direction reduction processing unit 82 decides whether the sub-scanning-direction reduction processing unit 82 has completed carrying out the sub-scanning-direction reduction process to the page of image data. If it is determined at the step S104 that the sub-scanning-direction reduction processing unit 82 has completed carrying out the sub-scanning-direction reduction process to the page of image data, the sub-scanning-direction reduction processing unit 82 ends the above-described process. On the other hand, if it is determined at the step S104 that the sub-scanning-direction reduction processing unit 82 has not completed carrying out the sub-scanning-direction reduction process to the page of image data, the sub-scanning-direction reduction processing unit 82 proceeds to the step S101, and carries out the odd-number line process to the next line.

If it is determined at the step S102 or S104 that the sub-scanning-direction reduction processing unit 82 has completed carrying out the sub-scanning-direction reduction process to the page of image data, the sub-scanning-direction reduction processing unit 82 ends the above-described process.

Figure 7:
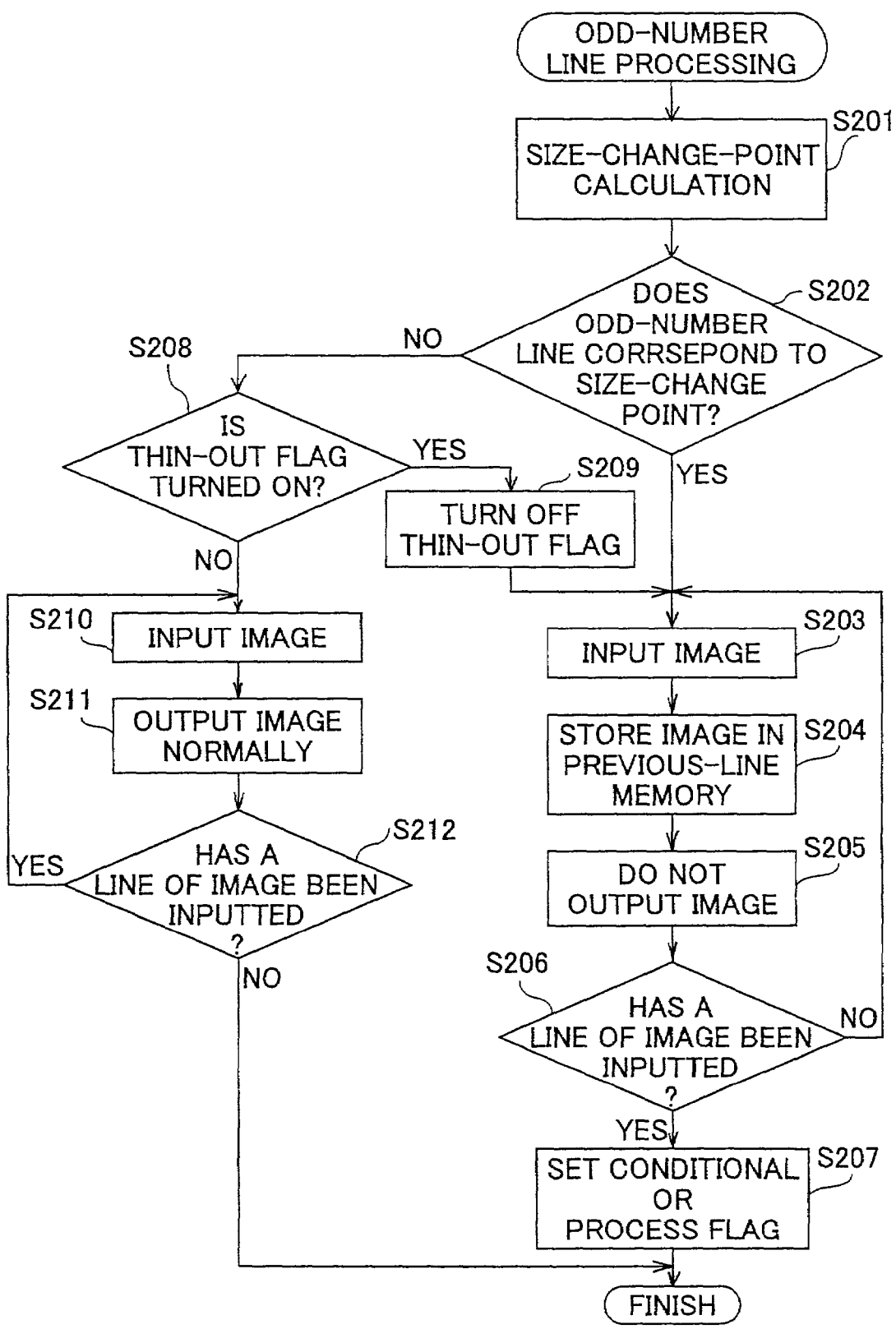
FIG. 7 is a flowchart showing an odd-number line process carried out by the sub-scanning-direction reduction processing unit.

FIG. 7 is a flowchart showing the odd-number line process (S101) carried out by the sub-scanning-direction reduction processing unit 82. At a step S201, the sub-scanning-direction reduction processing unit (the sub reduction unit) 82 calculates a later-described size-change point corresponding to a reduction rate. Subsequently, the sub reduction unit 82 checks whether a current odd-number line whose order is an odd number corresponds to the size-change point, at a step S202.

If it is determined at the step S202 that the current odd-number line corresponds to the size-change point, the main-scanning-direction reduced data DM is inputted to the sub reduction unit 82, at a step S203. Subsequently, the sub reduction unit 82 stores the inputted mains-scanning-direction reduced data DM in the previous-line memory 85, at a step S204. The sub reduction unit 82 thins out image data on the current odd-number line, and, thus, does not output an image, at a step S205. Additionally, the main-scanning-direction reduced data DM continues being inputted to the sub reduction unit 82 until a line of the main-scanning-direction reduced data DM has been inputted.

If it is determined at a step S206 that a line of the main-scanning-direction reduced data DM has been inputted to the sub reduction unit 82, the sub reduction unit 82 sets a conditional OR process flag so as to carry out the conditional OR process at an even-number line following the current odd-number line, at a step S207. The sub reduction unit 82, then, finishes the odd-number line process.

On the other hand, if it is determined at the step S202 that the current odd-number line does not correspond to the size-change point, the sub reduction unit 82 checks whether the a thin-out flag set by the even-number line process (S103) is on, at a step S208. If it is determined at the step S208 that the thin-out flag is turned on, the sub reduction unit 82 decides that the current odd-number line is a line to be thinned out, and proceeds to a step S209. The sub reduction unit 82 turns off the thin-out flag at the step S209, and proceeds to the step S203. Subsequently, the sub reduction unit 82 thins out the current odd-number line, and sets the conditional OR process flag, at the steps S203 through S207. The sub reduction unit 82, then, finishes the above-described odd-number line process.

If it is determined at the step S208 that the thin-out flag is turned off, the sub reduction unit 82 outputs the current odd-number line as it is. In other words, the main-scanning-direction reduced data DM is inputted to the sub reduction unit 82, at a step S210. Subsequently, at a step S211, the sub reduction unit 82 outputs the main-scanning-direction reduced data DM as the reduced data DS to the next-level device. The sub reduction unit 82 repeats the above-described steps S210 and S211 until a line of the main-scanning-direction reduced data DM has been inputted. If it is determined at a step S212 that a line of the main-scanning-direction reduced data DM has been inputted to the sub reduction unit 82, the sub reduction unit 82 finishes the odd-number line process.

Figure 8A:
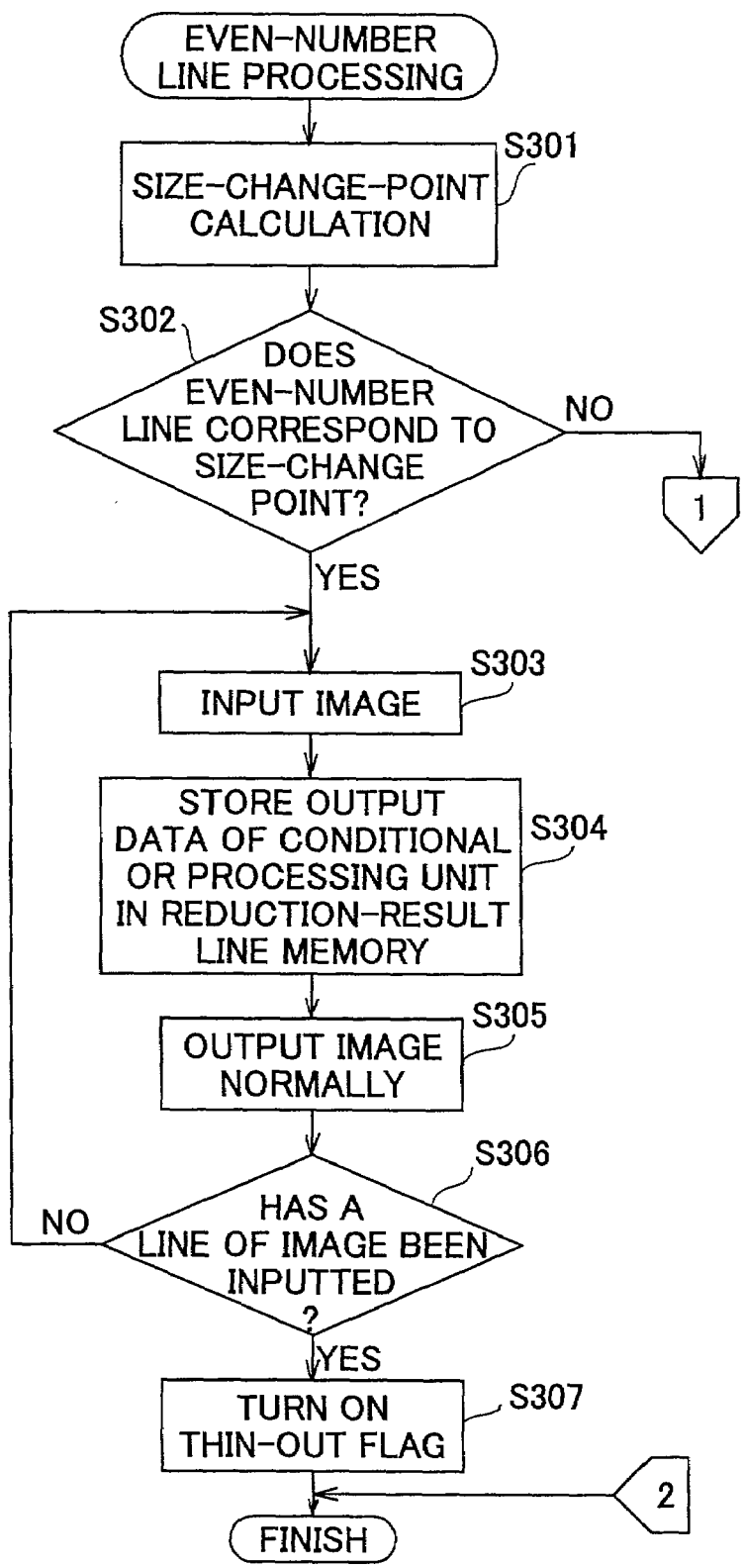
FIGS. 8A, 8B and 8C are flowcharts showing an even-number line process carried out by the sub-scanning-direction reduction processing unit.
Figure 8B:
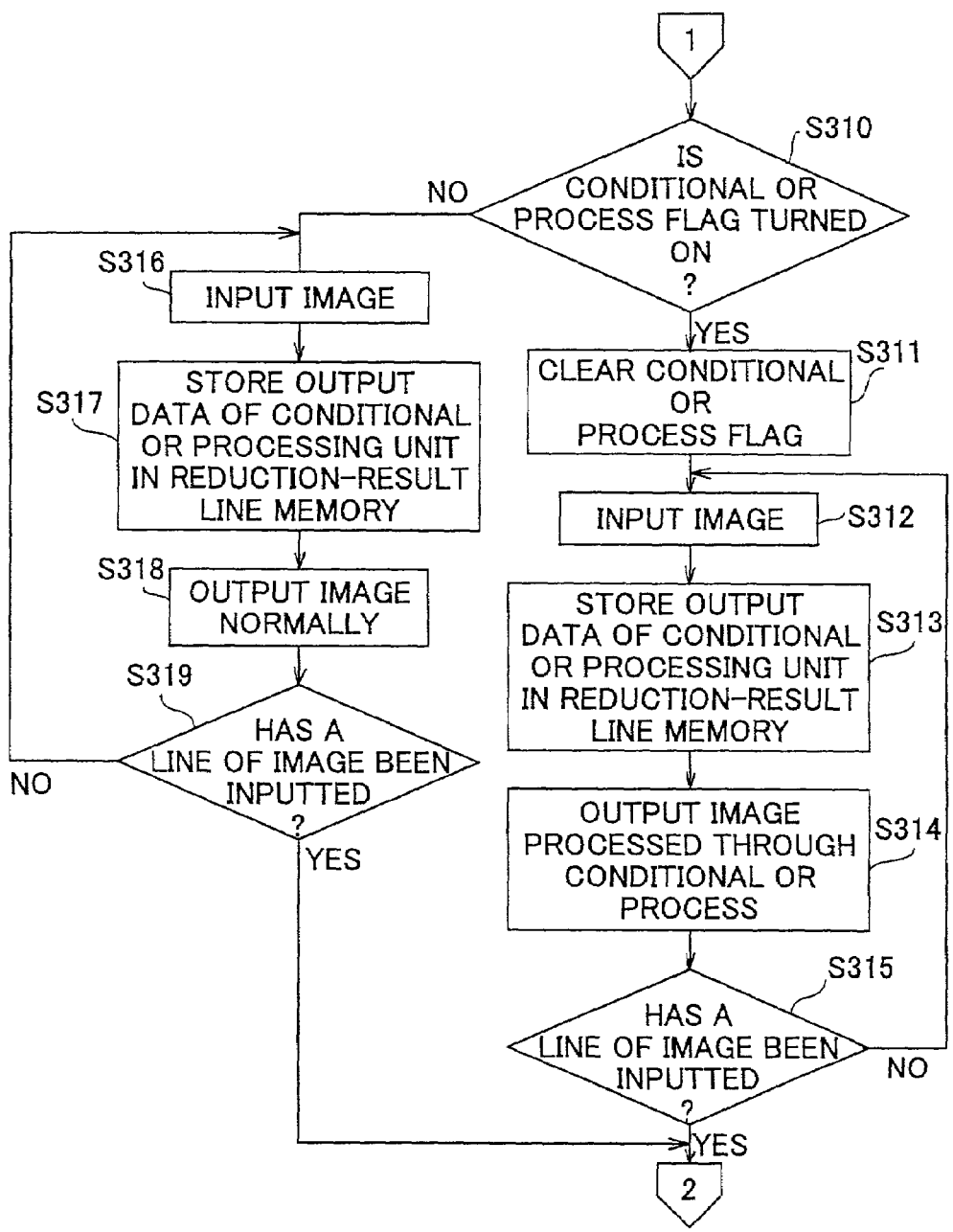
Figure 8C:
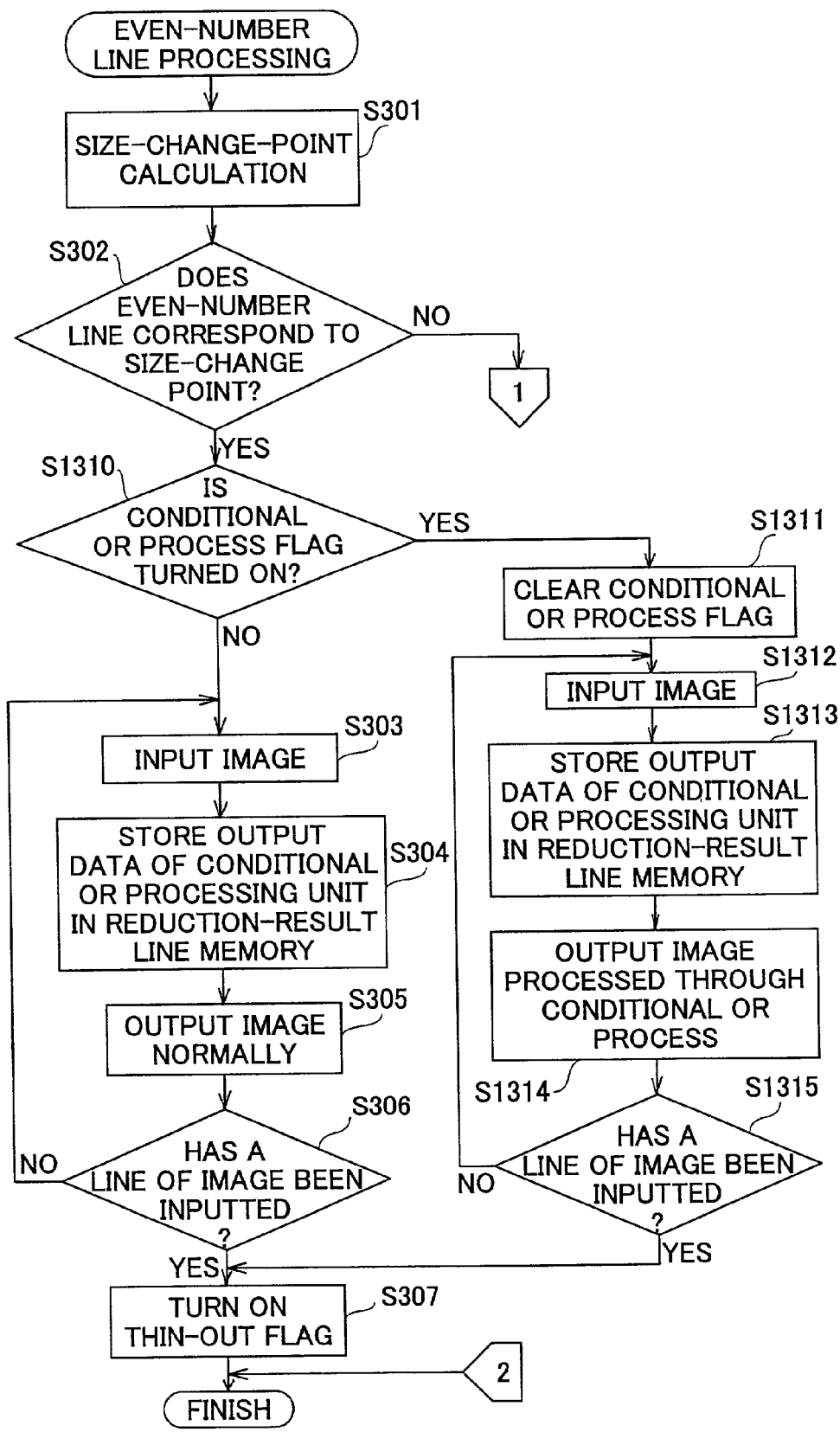

FIGS. 8A, 8B and 8C are flowcharts showing the even-number line process (S103) carried out by the sub-scanning-direction reduction processing unit 82. The sub reduction unit 82 initially calculates the later-described size-change point corresponding to the reduction rate, at a step S301. Subsequently, the sub reduction unit 82 checks whether a current even-number line corresponds to the size-change point, at a step S302.

If it is determined at the step S302 that the current even-number line corresponds to the size-change point, the main-scanning-direction reduced data DM is inputted to the sub reduction unit 82, at a step S303. Subsequently, the sub reduction unit 82 stores the output data DK outputted from the conditional OR processing unit 86, in the reduction-result line memory 88, at a step S304. Additionally, the sub reduction unit 82 outputs the inputted main-scanning-direction reduced data DM as the reduced data DS to the next-level device, at a step S305, in which the sub reduction unit 82 may alternatively output an image normally or output an image processed through conditional OR process.

The sub reduction unit 82 repeats the steps S303, S304 and S305 until a line of the main-scanning-direction reduced data DM has been inputted to the sub reduction unit 82.

If it is determined at a step S306 that a line of the main-scanning-direction reduced data DM has been inputted to the sub reduction unit 82, the sub reduction unit 82 turns on the thin-out flag so as to thin out an odd-number line following the current even-number line, at a step S307. The sub reduction unit 82, then, finishes the even-number line process.

If it is determined at the step S302 that the current even-number line does not correspond to the size-change point, the sub reduction unit 82 proceeds to a step S310, and checks whether the conditional OR process flag set by the odd-number line process is turned on.

If it is determined at the step S310 that the conditional OR process flag is turned on, the sub reduction unit 82 initially clears the conditional OR process flag, at a step S311. Subsequently, the main-scanning-direction reduced data DM is inputted to the sub reduction unit 82, at a step S312. The sub reduction unit 82 stores the output data DK outputted from the conditional OR processing unit 86, in the reduction-result line memory 88, at a step S313. Additionally, the sub reduction unit 82 outputs the output data DK of the conditional OR processing unit 86 as the reduced data DS to the next-level device, at a step S314. The sub reduction unit 82 repeats the above-described steps S312, S313 and S314 until a line of the main-scanning-direction reduced data DM has been inputted to the sub reduction unit 82.

If it is determined at a step S315 that a line of the main-scanning-direction reduced data DM has been inputted to the sub reduction unit 82, the sub reduction unit 82 finishes the even-number line process.

On the other hand, if it is determined at the step S310 that the conditional OR process flag is turned off, the main-scanning-direction reduced data DM is inputted to the sub reduction unit 82, at a step S316. The sub reduction unit 82 stores the output data DK outputted from the conditional OR processing unit 86, in the reduction-result line memory 88, at a step S317. Additionally, the sub reduction unit 82 outputs the inputted main-scanning-direction reduced data DM as the reduced data DS to the next-level device, at a step S318. The sub reduction unit 82 repeats the steps S316, S317 and S318 until a line of the main-scanning-direction reduced data DM has been inputted to the sub reduction unit 82.

If it is determined at a step S319 that a line of the main-scanning-direction reduced data DM has been inputted to the sub reduction unit 82, the sub reduction unit 82 finishes the above-described even-number line process.

FIG. 8C shows a variation of the flow chart shown in FIG. 8A. The difference between FIG. 8A and FIG. 8C is that the latter incorporates steps S310–S315 of FIG. 8B as steps S1310–S1315 after step S302.

Thus, in step S1310, the sub reduction unit 82 checks whether the conditional OR process flag set by the odd-number line process is turned on. If it is determined at the step S1310 that the conditional OR process flag is turned on, then the sub reduction unit 82 initially clears the conditional OR process flag at the step S1311. Subsequently, the main-scanning-direction reduced data DM is inputted to the sub reduction unit 82 at the step S1312. The sub reduction unit 82 stores the output data DK outputted from the conditional OR processing unit 86 in the reduction-result line memory 88 at the step S1313. Additionally, the sub reduction unit 82 outputs the output data DK of the conditional OR processing unit 86 as the reduced data DS to the next-level device at the step S1314. The sub reduction unit 82 repeats the above-described steps S1312, S1313 and S1314 until a line of the main-scanning-direction reduced data DM has been inputted to the sub reduction unit 82. When it is determined at a step S1315 that a line of the main-scanning-direction reduced data DM has been inputted to the sub reduction unit 82, the sub reduction unit 82 then proceeds to the step S303 described above, turning the thin-out flag ON.

FIG. 9 is a diagram showing the sub-scanning-direction reduction process in a case in which the reduction rate is 50%. Additionally, FIGS. 10A and 10B are diagrams showing the sub-scanning-direction reduction process in a case in which the reduction rate is 60%. The difference between the two cases shown in FIG. 10A and FIG. 10B is that, in the latter, the line 8 output data is the results of the conditional OR process.

More specifically, FIG. 10B shows the output results as applied to the flow chart of FIG. 8C as opposed to the flow chart of FIG. 8A. In this case, the line after the line of no output is always conditional OR output. In the case shown in FIG. 10B, the even-number line always has data output, becoming normal output when the preceding line is normal output and becoming conditional OR process output when the preceding line has no output.

According to the above-described embodiment, a line to which the conditional OR process is applied is limited to an even-number line, and, thus, a line memory necessary in the sub-scanning-direction reduction processing unit 82 can be limited to one. As a result, the above-described embodiment can achieve reduction of a device cost by a large amount.

According to the conditional OR process, a size of an image cannot be reduced at once if its reduction rate is less than 50%, because of the principle of the conditional OR process. For example, in order to achieve a 30% reduction rate (to obtain an image of a size which is 30% of an original one), two sub-scanning-direction reduction processing units 82 are connected in a cascade manner, wherein the first sub-scanning-direction reduction processing unit 82 reduces the size of an image to 60% of the image, and the second sub-scanning-direction reduction processing unit 81 reduces the image whose size is reduced to 60% of its original size, to 50% of the image.

However, since the conditional OR process is basically an OR process, application of the above-described cascade method does not affect preservation of lines in an image, but has a chance to cause decrease in a quality of the image such as line thickening. Thus, in a case in which an image is to be reduced at a targeted reduction rate less than 50%, a reduction rate is initially set to a value that is twice as large as a targeted reduction rate. Subsequently, the simple thinning-out method is applied to the image at the initially set reduction rate. The conditional OR process is, then, applied to the image processed by the simple thinning-out method, at a 50% reduction rate.

Figure 11A:
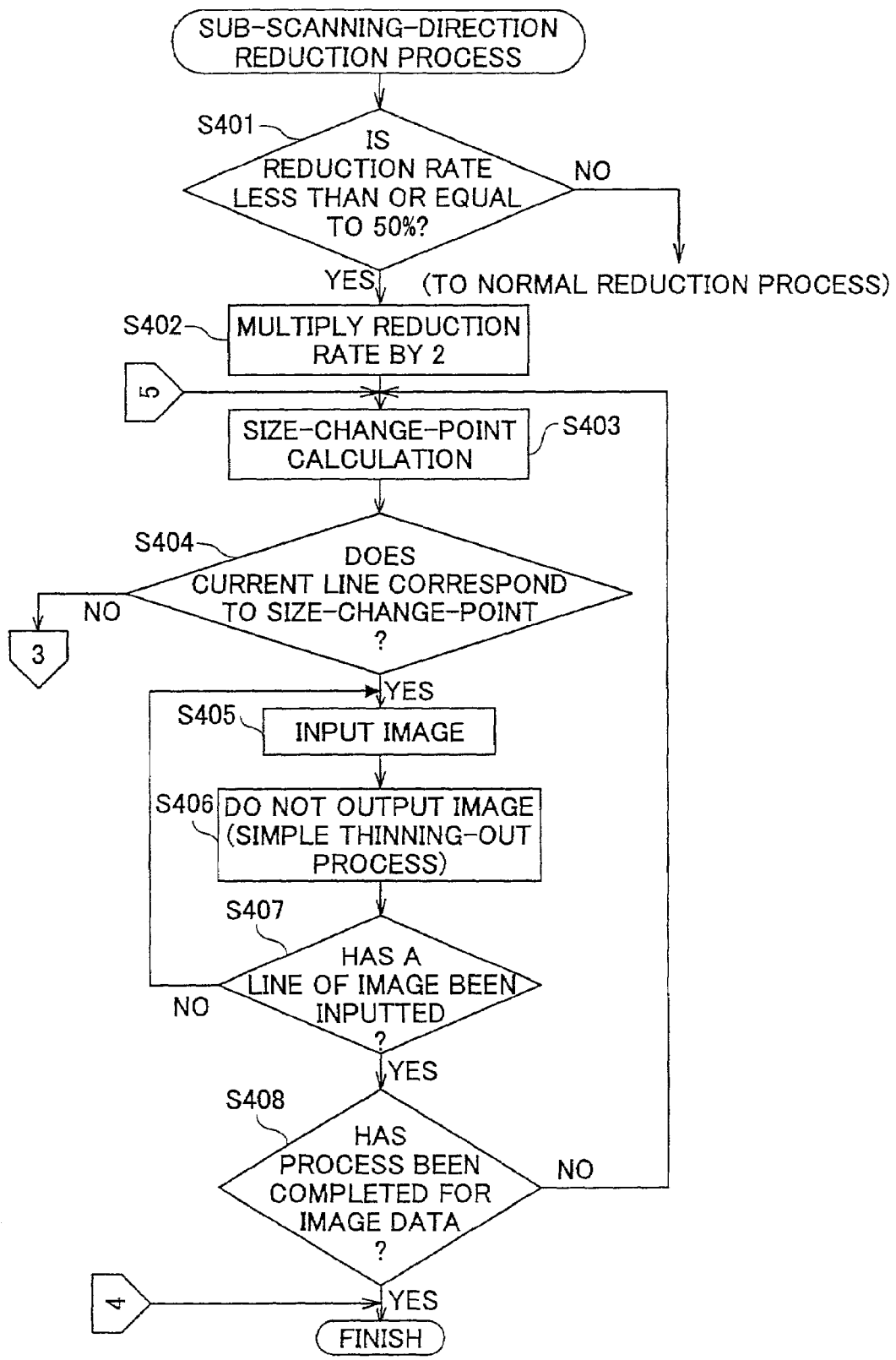
FIGS. 11A and 11B are flowcharts showing another sub-scanning-direction reduction process carried out by the sub-scanning-direction reduction processing unit.
Figure 11B:
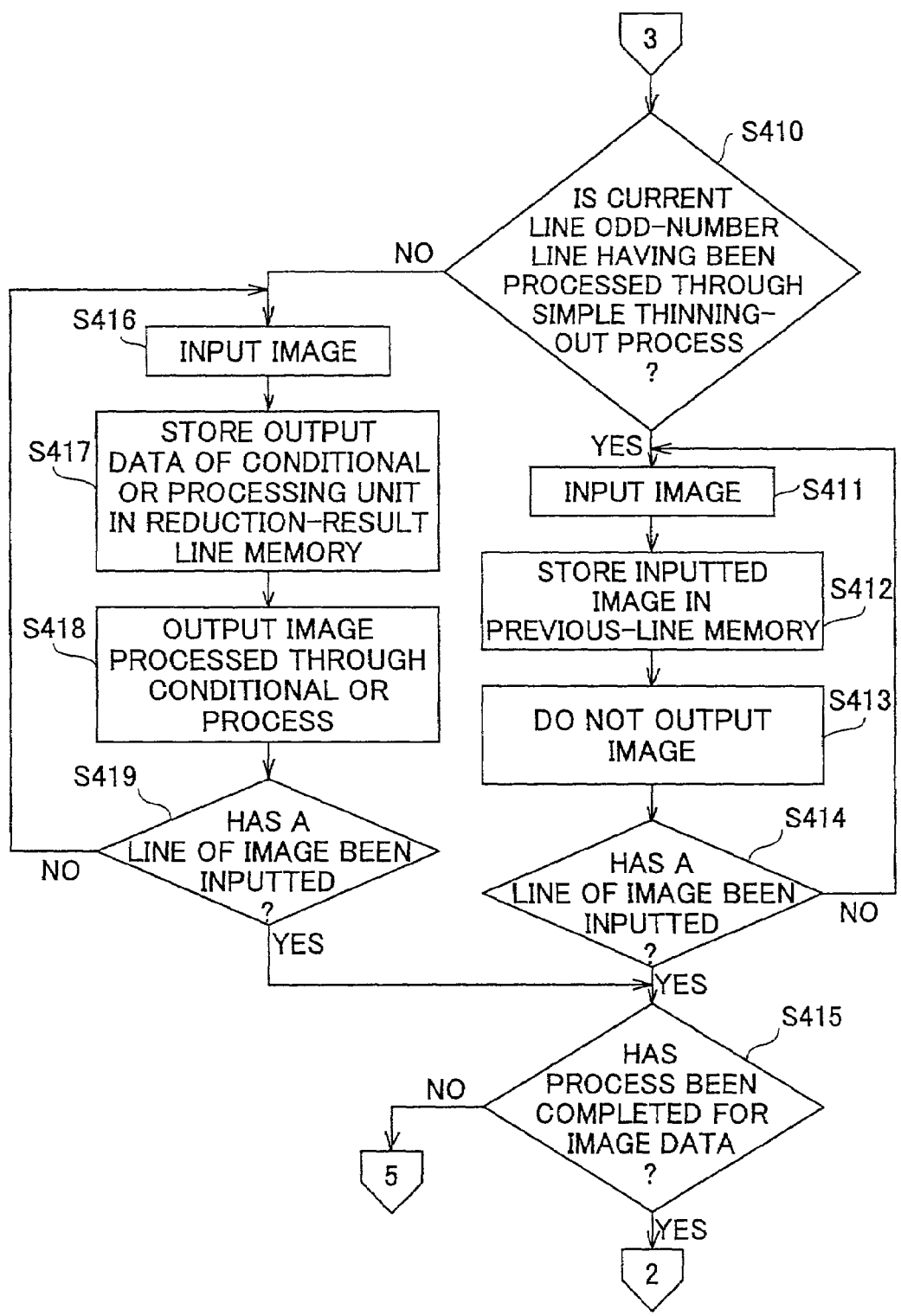

A detailed description about the above-described image reduction process at a reduction rate less than 50% is given below, with reference to FIGS. 11A and 11B. FIGS. 11A and 11B are flowcharts showing another sub-scanning-direction reduction process carried out by the sub-scanning-direction reduction processing unit 82.

The sub reduction unit 82 initially checks whether the reduction rate is set to less than 50%, at a step S401. If it is determined at the step S401 that the reduction rate is set higher than or equal to 50%, the sub reduction unit 82 carries out a normal sub-scanning-direction reduction process shown in FIGS. 6, 7, 8A, 8B and 8C.

On the other hand, if it is determined at the step S401 that the reduction rate is set to less than 50%, the sub reduction unit 82 multiplies the reduction rate by two, at a step S402. For example, if the reduction rate is set to 30%, the sub reduction unit 82 sets the reduction rate to 60%. At a step S403 following the step S402, the sub reduction unit 82 calculates a size-change point corresponding to the multiplied reduction rate. Subsequently, the sub reduction unit 82 checks whether a current line corresponds to the size-change point, at a step S404.

If it is determined at the step S404 that the current line corresponds to the size-change point, the main-scanning-direction reduced data DM is inputted to the sub reduction unit 82, at a step S405. The sub reduction unit 82 thins out image data on the current line by the simple thinning-out method, and, thus, does not output the image data, at a step S406. The sub reduction unit 82 repeats the above-described steps S405 and S406 until a line of the main-scanning-direction reduced data DM has been inputted to the sub reduction unit 82.

If it is determined at a step S407 that a line of the main-scanning-direction reduced data DM has been inputted to the sub reduction unit 82, the sub reduction unit 82 proceeds to a step S408. At the step S408, the sub reduction unit 82 checks whether the sub reduction unit 82 has finished processing a page of the main-scanning-direction reduced data DM.

If it is determined at the step S408 that the sub reduction unit 82 has not finished processing a page of the main-scanning-direction reduced data DM, the sub reduction unit 82 shifts back to the step S403, and repeats the steps S403 through S407 for the next line of the main-scanning-direction reduced data DM. On the other hand, if it is determined at the step S408 that the sub reduction unit 82 has finished processing a page of the main-scanning-direction reduced data DM, the sub reduction unit 82 finishes the above-described sub-scanning-direction reduction process.

If it is determined at the step S404 that the current line does not correspond to the size-change point, the sub reduction unit 82 proceeds to a step S410, and checks whether the current line corresponds to an odd-number line having been processed through a simple thinning-out process.

If it is determined at the step S410 that the current line corresponds to an odd-number line having been processed through the simple thinning-out process, the main-scanning-direction reduction data DM is inputted to the sub reduction unit 82, at a step S411. Subsequently, the sub reduction unit 82 stores the inputted main-scanning-direction reduction data DM in the previous-line memory 85, at a step S412. Additionally, the sub reduction unit 82 thins out image data on the odd-number line having been processed through the simple thinning-out process, and, thus, does not output the image data, at a step S413. The sub reduction unit 82 repeats the steps S411 through S413 until a line of the main-scanning-direction reduced data DM has been inputted to the sub reduction unit 82.

If it is determined at a step S414 that a line of the main-scanning-direction reduced data DM has been inputted to the sub reduction unit 82, the sub reduction unit 82 checks whether the sub reduction unit 82 has processed a page of the main-scanning-direction reduced data DM, at a step S415. If it is determined at the step S415 that the sub reduction unit 82 has not processed a page of the main-scanning-direction reduced data DM, the sub reduction unit 82 proceeds to the step S403, and carries out the step S403 and its following steps to the next line. On the other hand, if it is determined at the step S415 that the sub reduction unit 82 has processed a page of the main-scanning-direction reduced data DM, the sub reduction unit 82 finishes the above-described sub-scanning-direction reduction process.

If it is determined that the current line is an even-number line having been processed through the simple thinning-out process, and does not correspond to an odd-number line having been processed through the simple thinning-out process, the main-scanning-direction reduced data DM is inputted to the sub reduction unit 82, at a step S416. Subsequently, the sub reduction unit 82 stores the output data DK outputted from the conditional OR processing unit 86 in the reduction-result line memory 88, at a step S417. At a step S418 following the step S417, the sub reduction unit 82 outputs the output data DK of the conditional OR processing unit 86 as the reduced data DS to the next-level device, at a step S418.

The sub reduction unit 82 repeats the steps S416, S417 and S418 until a line of the main-scanning-direction reduced data DM has been inputted to the sub reduction unit 82. If it is determined at the step S419 that a line of the main-scanning-direction reduced data DM has been inputted to the sub reduction unit 82, the sub reduction unit 82 proceeds to the step S415, and checks whether the sub reduction unit 82 has processed a page of the main-scanning-direction reduced data DM.

FIG. 12 is a diagram showing the sub-scanning-direction reduction process carried out by the sub-scanning-direction reduction processing unit 82 by following the flowcharts shown in FIGS. 11A and 11B in a case in which the reduction rate is 30%.

In a case in which the conditional OR processing unit 86 is composed of a semiconductor integrated device, a process to install data input/output channels for processing odd-number lines and even-number lines in the conditional OR processing unit 86 and a circuit structure of the conditional OR processing unit 86 can be simplified, by matching the number of the data input/output channels for processing the odd-number lines and the number of the data input/output channels for processing the even-number lines.

Figure 13A:
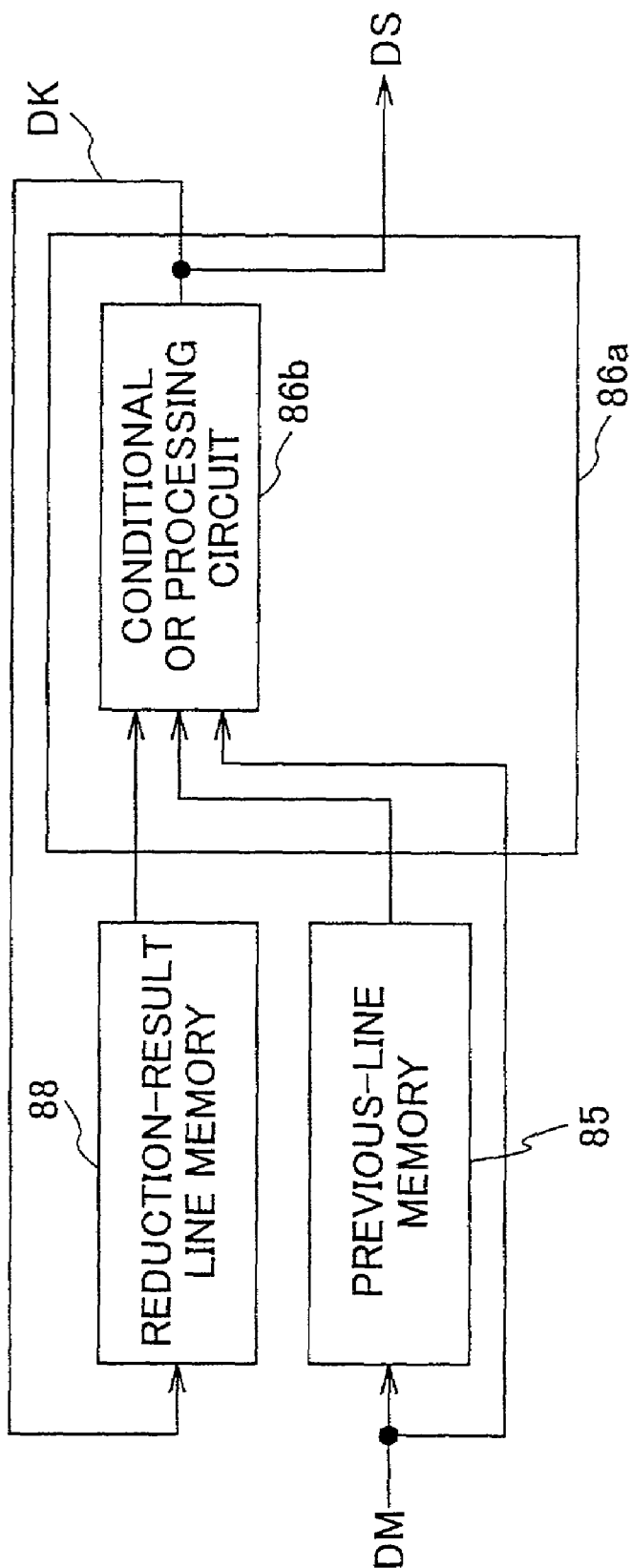
FIGS. 13A, 13B and 13C are block diagrams showing another construction of the sub-scanning-direction reduction processing unit.

In order to simplify the conditional OR processing unit 86 as described above, the sub-scanning-direction reduction processing unit 82 is constructed as shown in FIG. 13A. A conditional OR processing unit 86a included in the sub-scanning-direction reduction processing unit 82 shown in FIG. 13A is provided with three channels for inputting the main-scanning-direction reduced data DM, the output data of the previous-line memory 85 and the output data of the reduction-result line memory 88. Additionally, the conditional OR processing unit 86a is provided with two output channels for outputting the output data DK of a conditional OR processing circuit 86b carrying out a conditional OR process, and the reduced data DS.

For example, in a case in which a reduction result is outputted by use of even-number lines, the output data DK of the conditional OR processing circuit 86b is outputted as the reduced data DS, as shown in FIG. 13A. In a case in which a normal image is outputted by use of the even-number lines, the main-scanning-direction reduced data DM inputted to the conditional OR processing circuit 86b is outputted as the reduced data DS, as shown in FIG. 13B.

Figure 13B:
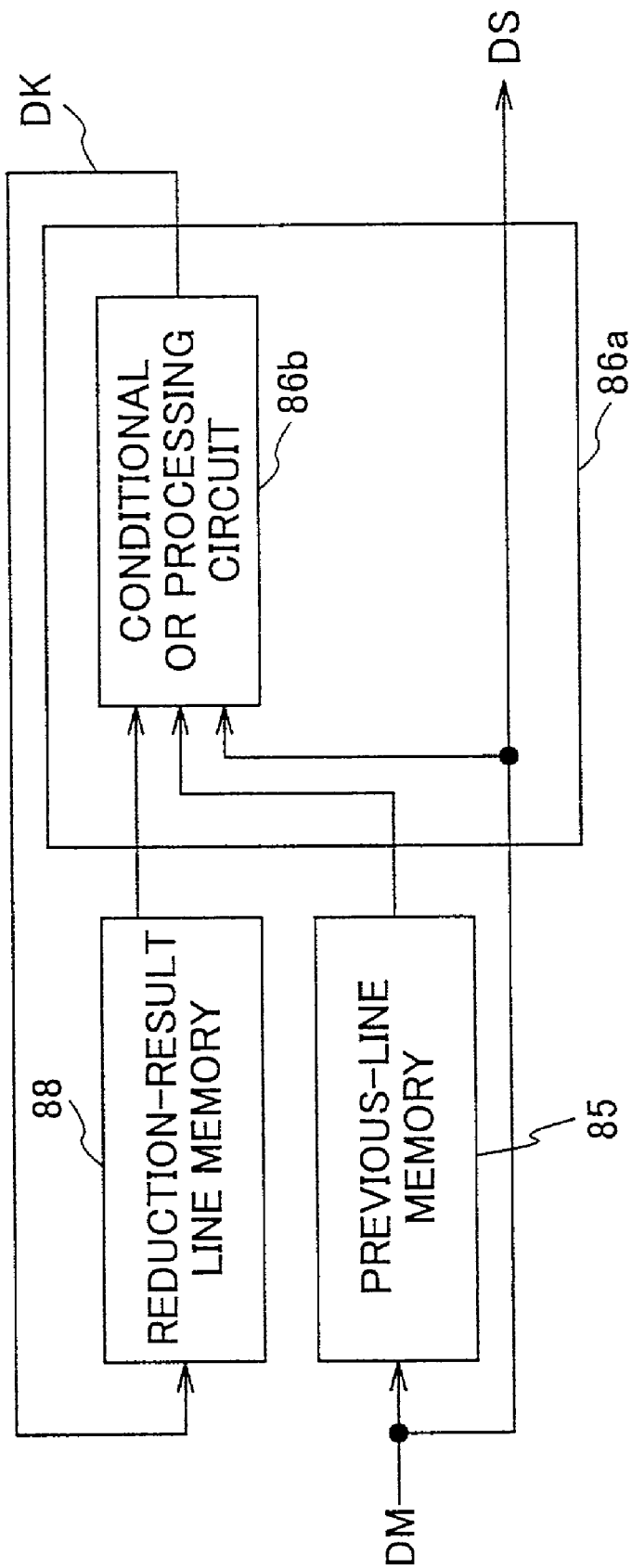
Figure 13C:
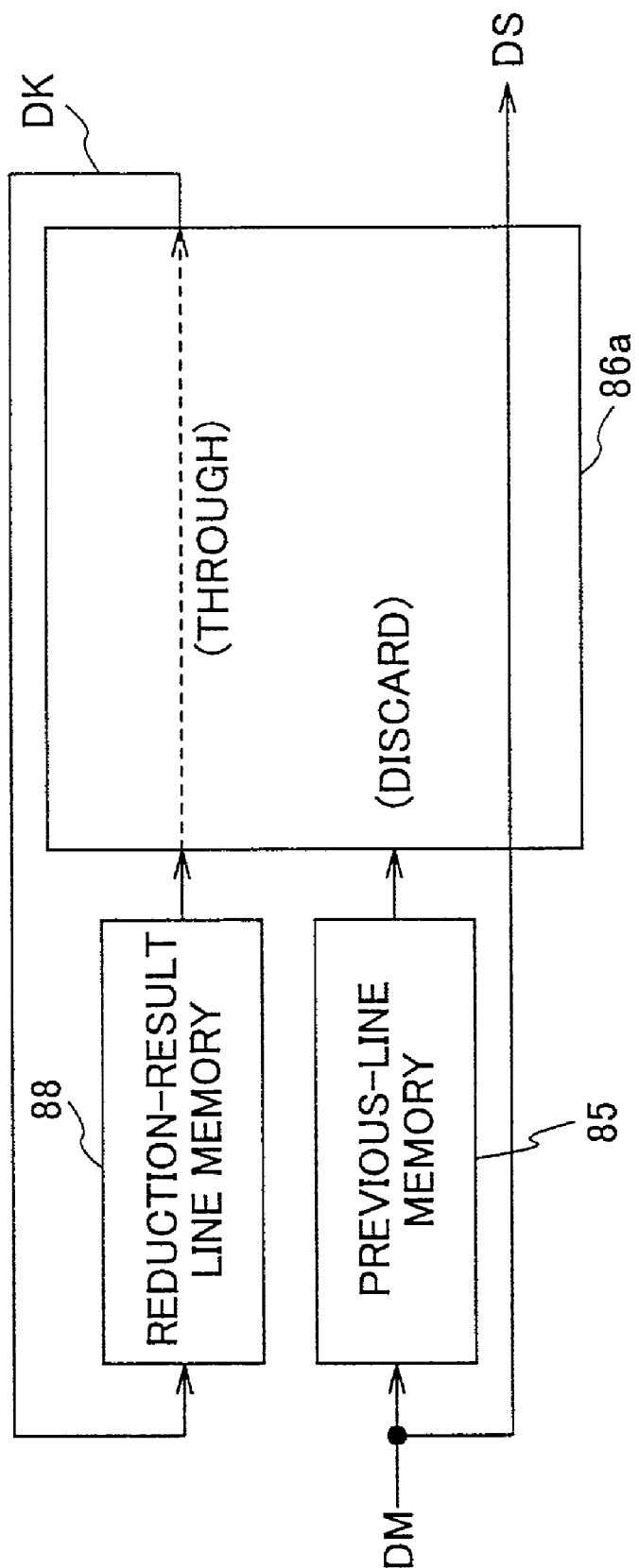

In a case in which a normal image is outputted by use of odd-number lines, the output of the reduction-result line memory 88 is passed through the conditional OR processing unit 86a, and is fed back as the data DK to the reduction-result line memory 88, as shown in FIG. 13C. Additionally, the main-scanning-direction reduced data DM inputted to the conditional OR processing unit 86a is outputted as the reduced data DS. Data inputted from the previous-line memory 85 to the conditional OR processing unit 86a is discarded inside the conditional OR processing unit 86a. If an odd-number line corresponds to a line to be thinned out, the reduced data DS shown in FIG. 13C is not outputted.

According to the present invention as described above, a relation between data input/output is identical under each condition shown in FIGS. 13A, 13B and 13C, and, thus, a memory access control related to the conditional OR processing unit 86 can be simplified. It should be noted that the conditional OR processing unit 86a shown in FIGS. 13A, 13B and 13C corresponds to the conditional OR processing unit 86 shown in FIG. 5.

A description will now be given of size-change-point calculation with reference to a flowchart shown in FIG. 14. In this size-change-point calculation, an equation for obtaining a size-change rate R is set as the following equation (II).

$$R = y/x \qquad (II)$$

The size-change rate R is determined by setting "x" as a variable value, and "y" as a fixed value. For instance, in a case in which the size-change rate R is set between 12.5% and 100%, a value of "x" is set between 256 and 2048 according to the size-change rate R when a value of "y" is fixed to 256. In a case in which the size-change rate R is set to 50%, y/x can be set to 256/512 or 512/1024 in accordance with accuracy requested by a size-change point.

Figure 14:
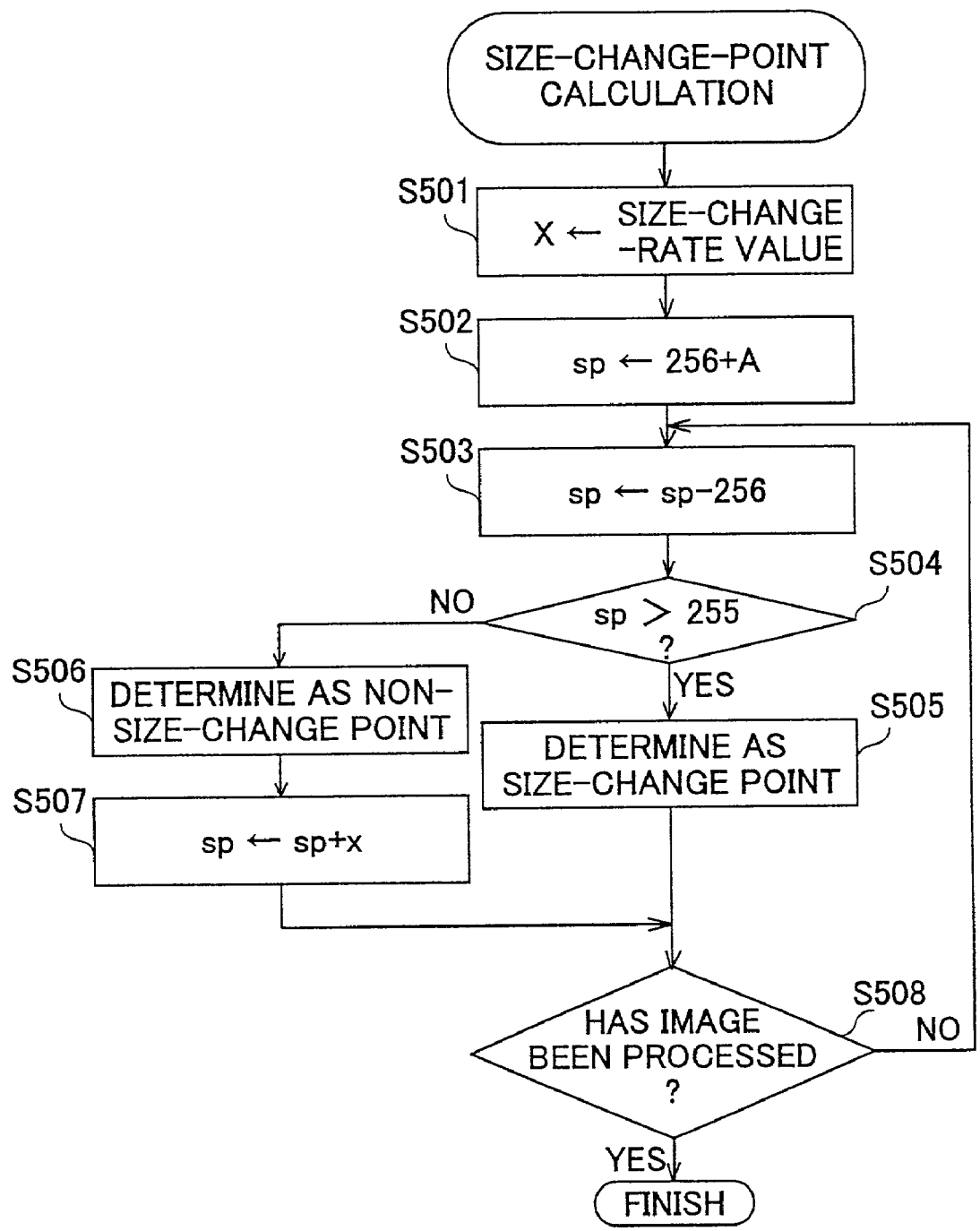
FIG. 14 is a flowchart showing size-change-point calculation.

FIG. 14 is a flowchart showing the size-change-point calculation. At a step S501, a value (a size-change-rate value) corresponding to the size-change rate R expressed in the equation (II) is set to the fixed value "x", at a step S501. The value 256 of "y" included in the equation (II) added with an offset value A is set to a variable "sp", at a step S502. This offset value A is used for changing the size-change point. Subsequently, the variable "sp" is updated by subtracting the value 256 from the variable "sp", at a step S503. At a step S504, the updated variable "sp" is compared with the value 255 whether the variable "sp" is larger than the value 255.

If it is determined at the step S504 that the updated variable "sp" is larger than the value 255, a current point, which is a pixel for a size-change process in a main-scanning direction, or a line for a size-change process in a sub-scanning direction, is determined as the size-change point, at a step S505. If the size-change process in the main-scanning direction is to be performed, a currently focused pixel is not outputted. If the size-change process in the sub-scanning direction is to be performed, a currently focused line is not outputted.

On the other hand, if it is determined at the step S504 that the updated variable "sp" is not larger than the value 255, the current point is determined as non-size-change point, at a step S506. If the size-change process in the main-scanning direction is to be performed, the currently focused pixel is outputted. If the size-change process in the sub-scanning direction is to be performed, the currently focused line is outputted. Subsequently, the variable "sp" is updated by adding the fixed value "x" to the variable "sp", at a step S507.

At a step S508, it is determined whether an entire image has been processed after calculating the size-change point once by taking the above-described steps. If not, the next image data is processed, at the step S503. If it is determined at the step S508 that the entire image has been processed, the size-change-point calculation shown in FIG. 14 is terminated.

It should be noted that switching the odd number lines and even number lines in above-described embodiment accomplishes the same effect as described above.

The size-change-point calculation is not limited to the above-described calculation shown in FIG. 14, and can adopt other known methods. Additionally, a description has been given of the embodiments, in which the present invention is applied to a G3 facsimile device. In addition, the present invention can be applied to an image processing device other than the G3 facsimile device that processes a binary image.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-232943, filed on Aug. 1, 2000, the entire contents of which are hereby incorporated by reference.

What is claimed is:

1. A method of reducing a size of a binary image, comprising the steps of:
    reducing the size of the binary image in a sub-scanning direction by using a conditional OR process; and
    limiting a size-change point determined by a reduction rate to an odd-number line or an even-number line,
    wherein the conditional OR process is carried out only on one of the odd-number line or the even-number line,
    when the one of the odd-number line or the even-number line to process corresponds to a size-change point, after the line has been processed, a thin-out flag is turned on for the other line, and
    when the other line corresponds to a size-change point or the thin-out flag is turned on therefor, image output is not carried out.

2. The method of reducing the size of a binary image as claimed in claim 1, further comprising the step of thinning out an image of either a line immediately preceding or a line immediately following the size-change point.

3. The method of reducing the size of a binary image as claimed in claim 1, wherein the size of the binary image in a scanning direction is reduced before the size of the binary image in the sub-scanning direction is reduced.

4. A method of a size of a binary image, wherein a reduction process in a sub-scanning direction comprises the steps of:
    thinning out an image of an odd-numbered line and producing a reduced image using a conditional OR process for an even-number line immediately following the odd-number line when a size-change point determined by a reduction rate is the odd-number line,
    producing a reduced image using a conditional OR process for an even-number line and thinning out an image of an odd-number line immediately following the even-number line when the size-change point determined by the reduction rate is the even-number line.

5. The method of reducing the size of a binary image as claimed in claim 4, wherein the method produces but does not output the reduced image and instead outputs a non-reduced image for the even-number line.

6. The method of reducing the size of a binary image as claimed in claim 4, wherein the method produces and outputs the reduced image when the size-change point determined by the reduction rate is the even-number line.

7. The method of reducing the size of a binary image as claimed in claim 4, wherein the method produces but does not output a reduced image and instead outputs a non-reduced image for the even-number line when the immediately preceding odd-number line is not thinned out.

8. The method of reducing the size of a binary image as claimed in claim 4, wherein the method produces and outputs a reduced image for the even-number line when the immediately preceding odd-number line is thinned out.

9. A method of reducing a size of a binary image, wherein a reduction process in a sub-scanning direction comprises the steps of:
    thinning out an image of an even-numbered line and producing a reduced image using a conditional OR process for an odd-number line immediately following the even-number line when a size-change point determined by a reduction rate is the even-number line,
    producing a reduced image using a conditional OR process for an odd-number line and thinning out an image of an even-number line immediately following the odd-number line when the size-change point determined by the reduction rate is the odd-number line.

10. The method of reducing the size of a binary image as claimed in claim 9, wherein the method produces but does not output a reduced image and instead outputs a non-reduced image for the odd-number line.

11. The method of reducing the size of a binary image as claimed in claim 9, wherein the method produces and outputs a reduced image for the odd-number line.

12. The method of reducing the size of a binary image as claimed in claim 9, wherein the method produces but does not output a reduced image and instead outputs a non-reduced image for the odd-number line when the immediately preceding even-number line is not thinned out.

13. The method of reducing the size of a binary image as claimed in claim 9, wherein the method produces and outputs a reduced image for the odd-numbered line when the immediately preceding even-number line is thinned out.

14. A method of reducing the size of a binary image, comprising the steps of:
    reducing the size of the binary image in a sub-scanning direction by using a conditional OR process; and
    limiting a size-change point determined by a reduction rate to an odd-number line or an even-number line,
    wherein, when a target reduction rate is 50 percent or below, a binary image of the target reduction rate is produced by reducing the size of the binary image in the sub-scanning direction to twice the target reduction rate using a simple thinning-out method and further reducing the reduced binary image to the target reduction rate using the conditional OR process.

15. An image processing device for processing a binary image comprising:
    a first component that thins out an image of an odd-numbered line and produces a reduced image using a conditional OR process for an even-number line immediately following the odd-number line when a size-change point determined by a reduction rate is the odd-number line; and
    a second component that produces a reduced image using a conditional OR process for an even-number line and thins out an image of an odd-number line immediately following the even-number line when the size-change point determined by the reduction rate is the even-number line.

16. The image processing device for processing a binary image as claimed in claim 15, wherein the device produces but does not output a reduced image and instead outputs a non-reduced image for the even-number line.

17. The image processing device for processing a binary image as claimed in claim 15, wherein the device produces and outputs the reduced image for the even-number line.

18. The image processing device for processing a binary image as claimed in claim 15, wherein the device produces but does not output a reduced image and instead outputs a non-reduced image for the even-number line when the immediately preceding odd-number line is not thinned out.

19. The image processing device for processing a binary image as claimed in claim 15, wherein the device produces and outputs a reduced image for the even-number line when the immediately preceding odd-number line is thinned out.

20. An image processing device for processing a binary image method comprising:
a first component that thins our an image of an even-numbered line and produces a reduced image using a conditional OR process for an odd-number line immediately following the even-number line when a size-change point determined by a reduction rate is the even-number line; and
a second component that produces a reduced image using a conditional OR process for an odd-number line and thins out an image of an even-number line immediately following the odd-number line when the size-change point determined by the reduction rate is the odd-number line.

21. The image processing device for processing a binary image as claimed in claim 20, wherein the device produces but does not output a reduced image and instead outputs a non-reduced image for the odd-number line.

22. The image processing device for processing a binary image as claimed in claim 20, wherein the device produces and outputs a reduced image for the odd-number line.

23. The image processing device for processing a binary image as claimed in claim 20, wherein the device produces but does not output a reduced image and instead outputs a non-reduced image for the odd-number line when the immediately preceding even-number line is not thinned out.

24. The image processing device for processing a binary image as claimed in claim 20, wherein the device produces and outputs a reduced image for the odd-number line when the immediately preceding even-number line is thinned out.

25. An image processing device for processing a binary image comprising:
an image size reduction component that reduces the size of the binary image in a sub-scanning direction by using a conditional OR process; and
a limiting component that limits a size-change point determined by a reduction rate to an odd-number line or an even-number line,
wherein the image size reduction component, when a target reduction rate is 50 percent or below, produces a binary image of the target reduction by reducing the size of the binary image in the sub-scanning direction using a simple thinning-out method to twice the target reduction rate and further reduces the reduced binary image to the target reduction rate using the conditional OR process.

26. An image processing device for processing a binary image comprising:
an image size reduction component that reduces the size of the binary image in a sub-scanning direction by using a conditional OR process; and
a limiting component that limits a size-change point determined by a reduction rate to an odd-number line or an even-number line,
wherein the image size reduction component, when a current process line is other than the size-change point, reads and then discards data of an immediately preceding line memory component, and rewrites data read from a memory component in which a preceding reduction result is stored to the preceding line memory component.

27. An image processing device for processing a binary image comprising:
a conditional OR processing component that reduces a size of an image in a sub-scanning direction using a conditional OR process;
a reduction result line memory component that stores data output from the conditional OR processing component;
an immediately preceding line memory component that stores binary image data of an immediately preceding line; and
a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, and limits a size-change point determined by a reduction rate and employing the data output from the conditional OR processing component to either an odd-number line or an even-number line.

28. The image processing device as claimed in claim 27, wherein the control component further thins out an image of either a line immediately preceding or a line immediately following the odd-number line or the even-number line corresponding to the size-change point.

29. The image processing device as claimed in claim 27, wherein the control component reduces the size of the binary image in a scanning direction before reducing the size of the binary image in the sub-scanning direction.

30. The image processing device as claimed in claim 27, wherein the control component, when a target reduction rate is 50 percent or below, produces a binary image of the target reduction rate by reducing the size of the binary image in the sub-scanning direction to twice the target reduction rate using a simple thinning-out method and further reducing the reduced binary image to the target reduction rate using the conditional OR process.

31. An image processing device for processing a binary image comprising:
a conditional OR processing component that reduces a size of an image in a sub-scanning direction using a conditional OR process;
a reduction result line memory component that stores data output from the conditional OR processing component;
an immediately preceding line memory component that stores binary image data of an immediately preceding line; and
a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, wherein:

when a size-change point determined by a reduction rate is an odd-number line, the control component thins out an image of the odd-number line and reduction data is produced by the conditional OR processing component for an even-number line immediately succeeding the odd-number line; and when the size-change point determined by the reduction rate is an even-number line, reduction data is produced by conditional OR processing component for the even-number line and thins out an image of an odd-number line immediately succeeding the even-number line.

32. The image processing device for processing a binary image as claimed in claim 31, wherein the device does not output the produced reduction data and instead outputs non-reduction data for the even-number line.

33. The image processing device for processing a binary image as claimed in claim 31, wherein the device produces and outputs the reduced image for the even-number line.

34. The image processing device for processing a binary image as claimed in claim 31, wherein the device produces but does not output a reduced image and instead outputs a non-reduced image for the even-number line when the immediately preceding odd-number line is not thinned out.

35. The image processing device for processing a binary image as claimed in claim 31, wherein the method produces and outputs a reduced image for the even-number line when the immediately preceding odd-number line is thinned out.

36. An image processing device for processing a binary image comprising:
  a conditional OR processing component that reduces a size of an image in a sub-scanning direction using a conditional OR process;
  a reduction result line memory component that stores data output from the conditional OR processing component;
  an immediately preceding line memory component that stores binary image data of an immediately preceding line; and
  a control component that inputs binary image data of a current processing line, preceding reduction result data read from the reduction result line memory component, and binary image data of an immediately preceding line read from the immediately preceding line memory component to the conditional OR processing component so as to perform conditional OR processing of the current processing line, wherein:
  when a size-change point determined by a reduction rate is an even-number line, the control component thins out an image of the even-number line and produces reduction data by the conditional OR processing component for an odd-number line immediately succeeding the even-number line; and
  when the size-change point determined by the reduction rate is an odd-number line, the control component produces reduction data output by the conditional OR processing component for the odd-number line and thins out an image of an even-number line immediately succeeding the odd-number line.

37. The image processing device for processing a binary image as claimed in claim 36, wherein the device produces but does not output the reduced image and instead outputs a non-reduced image for the odd-number line.

38. The image processing device for processing a binary image as claimed in claim 36, wherein the method produces and outputs a reduced image for the odd-number line.

39. The image processing device for processing a binary image as claimed in claim 36, wherein the method produces but does not output a reduced image and instead outputs a non-reduced image for the odd-number line when the immediately preceding even-number line is not thinned out.

40. The image processing device for processing a binary image as claimed in claim 36, wherein the method produces and outputs a reduced image for the odd-number line when the immediately preceding even-number line is thinned out.

41. A method of controlling an image processing device for processing a binary image, the method comprising the steps of:
  reducing a size of an image in a sub-scanning direction using a conditional OR process conducted by a conditional OR processing component;
  storing data output from the conditional OR processing component in a reduction result line memory component;
  storing binary image data of an immediately preceding line in an immediately preceding line memory component;
  inputting binary image data of a current processing line, preceding reduction result data read from the reduction result line memory component, and binary image data of an immediately preceding line read from the immediately preceding line memory component to the conditional OR processing component so as to perform conditional OR processing of the current processing line; and
  limiting a size-change point determined by a reduction rate and employing the data output from the conditional OR processing component to either an odd-number line or an even-number line.

42. The method of controlling an image processing device for processing a binary image as claimed in claim 41, further comprising the step of
  thinning out an image of either a line immediately preceding or a line immediately following the odd-number line or the even-number line corresponding to the size-change point.

43. The method of controlling an image processing device for processing a binary image as claimed in claim 41, wherein the size of the binary image in a scanning direction is reduced before the size of the binary image in the sub-scanning direction is reduced.

44. The method of controlling an image processing device for processing a binary image as claimed in claim 41, wherein, when a target reduction rate is 50 percent or below, a binary image of the target reduction rate is produced by reducing the size of the binary image in the sub-scanning direction to twice the target reduction rate using a simple thinning-out method and further reducing the reduced binary image to the target reduction rate using the conditional OR process.

45. A method of controlling an image processing device for processing a binary image, the method comprising the steps of:
  reducing a size of an image in a sub-scanning direction using a conditional OR process conducted by a conditional OR processing component;
  storing data output from the conditional OR processing component in a reduction result line memory component;
  storing binary image data of an immediately preceding line in an immediately preceding line memory component;
  inputting binary image data of a current processing line, preceding reduction result data read from the reduction result line memory component, and binary image data of an immediately preceding line read from the immediately preceding line memory component to the conditional OR processing component so as to perform conditional OR processing of the current processing line;

thinning out an image of an odd-number line and causing reduction data to be produced by the conditional OR processing component for an even-number line immediately succeeding the odd-number line when a size-change point determined by a reduction rate is the odd-number line; and causing reduction data produced by the conditional OR processing component for an even-number line and thinning out an image of an odd-number line immediately succeeding the even-number line when the size-change point determined by the reduction rate is the even-number line.

46. The method of controlling an image processing device for processing a binary image as claimed in claim 45, wherein the step of producing a reduced image using the conditional OR process produces but does not output the reduced image and instead outputs a non-reduced image for the even-number line.

47. The method of controlling an image processing device for processing a binary image as claimed in claim 45, wherein the step of producing a reduced image using the conditional OR process produces and outputs the reduced image for the even-number line.

48. The method of controlling an image processing device for processing a binary image as claimed in claim 45, wherein the step of producing a reduced image using the conditional OR process method produces but does not output a reduced image and instead outputs a non-reduced image for the even-number line when the immediately preceding odd-number line is not thinned out.

49. The method of controlling an image processing device for processing a binary image as claimed in claim 45, wherein the step of producing a reduced image using the conditional OR process method produces and outputs a reduced image for the even-number line when the immediately preceding odd-number line is thinned out.

50. A method of controlling an image processing device for processing a binary image, the method comprising the steps of:

reducing a size of an image in a sub-scanning direction using a conditional OR process conducted by a conditional OR processing component;

storing data output from the conditional OR processing component in a reduction result line memory component;

storing binary image data of an immediately preceding line in an immediately preceding line memory component;

inputting binary image data of a current processing line, preceding reduction result data read from the reduction result line memory component, and binary image data of an immediately preceding line read from the immediately preceding line memory component to the conditional OR processing component so as to perform conditional OR processing of the current processing line;

thinning out an image of an even-number line and causing reduction data to be produced by the conditional OR processing component for an odd-number line immediately succeeding the even-number line when a size-change point determined by a reduction rate is the even-number line; and causing reduction data produced by the conditional OR processing component for an odd-number line and thinning out an image of an even-number line immediately succeeding the odd-number line when the size-change point determined by the reduction rate is the odd-number line.

51. The method of controlling an image processing device for processing a binary image as claimed in claim 50, wherein the method produces but does not output a reduced image for the odd-number line.

52. The method of controlling an image processing device for processing a binary image as claimed in claim 50, wherein the method produces and outputs a reduced image for the odd-number line.

53. The method of controlling an image processing device for processing a binary image as claimed in claim 50, wherein the method produces but does not output a reduced image and instead outputs a non-reduced image for the odd-number line when the immediately preceding even-number line is not thinned out.

54. The method of controlling an image processing device for processing a binary image as claimed in claim 50, wherein the method produces and outputs a reduced image for the odd-number when the immediately preceding even-number line is thinned out.

* * * * *